(12) United States Patent
Zhao et al.

(10) Patent No.: US 12,335,525 B2
(45) Date of Patent: Jun. 17, 2025

(54) ORTHOGONAL TRANSFORM GENERATION WITH SUBSPACE CONSTRAINT

(71) Applicant: TENCENT AMERICA LLC, Palo Alto, CA (US)

(72) Inventors: Xin Zhao, San Jose, CA (US); Madhu Peringassery Krishnan, Mountain View, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/465,814

(22) Filed: Sep. 12, 2023

(65) Prior Publication Data
US 2024/0007673 A1    Jan. 4, 2024

Related U.S. Application Data

(63) Continuation of application No. 17/568,871, filed on Jan. 5, 2022, now Pat. No. 11,792,431.
(Continued)

(51) Int. Cl.
*H04N 19/61* (2014.01)
*H04N 19/11* (2014.01)
(Continued)

(52) U.S. Cl.
CPC ............. *H04N 19/61* (2014.11); *H04N 19/11* (2014.11); *H04N 19/159* (2014.11);
(Continued)

(58) Field of Classification Search
CPC ...... H04N 19/61; H04N 19/11; H04N 19/159; H04N 19/172; H04N 19/176; H04N 19/18; H04N 19/42
(Continued)

(56) References Cited

U.S. PATENT DOCUMENTS

| | | |
|---|---|---|
| 2020/0322611 A1 | 10/2020 | Salehifar et al. |
| 2021/0076070 A1 | 3/2021 | Jung |
| 2021/0099704 A1 | 4/2021 | Koo |

FOREIGN PATENT DOCUMENTS

CN    111869218 A    10/2020

OTHER PUBLICATIONS

Fracastoro et al.; "Graph Transform Optimization with Application to Image Compression"; IEEE Transactions on Image Processing; Aug. 2019; pp. 419-432.
(Continued)

*Primary Examiner* — Nguyen T Truong
(74) *Attorney, Agent, or Firm* — Crowell & Moring LLP

(57) ABSTRACT

This disclosure relates to a transform kernel sharing in video encoding and decoding. For example, a method is disclosed for such transform kernel sharing. The method may include identifying a plurality of transform kernels, wherein each of the plurality of transform kernels comprises a set of basis vectors from low to high frequencies; N high-frequency basis vectors of two or more of the plurality of transform kernels are shared, N being a positive integer; and low-frequency basis vectors of the two or more of the plurality of the transform kernels other than the N high-frequency basis vectors are individualized. The method may further include extracting a data block from a video bitstream; selecting a transform kernel from the plurality of transform kernels based on information associated with the data block; and applying the transform kernel to at least a portion of the data block to generate a transformed block.

20 Claims, 18 Drawing Sheets

Related U.S. Application Data

(60) Provisional application No. 63/172,060, filed on Apr. 7, 2021.

(51) Int. Cl.
  *H04N 19/159* (2014.01)
  *H04N 19/172* (2014.01)
  *H04N 19/176* (2014.01)
  *H04N 19/18* (2014.01)
  *H04N 19/42* (2014.01)
  *H04N 19/593* (2014.01)

(52) U.S. Cl.
  CPC ......... *H04N 19/172* (2014.11); *H04N 19/176* (2014.11); *H04N 19/18* (2014.11); *H04N 19/42* (2014.11); *H04N 19/593* (2014.11)

(58) Field of Classification Search
  USPC .................................................. 375/240.12
  See application file for complete search history.

(56) References Cited

OTHER PUBLICATIONS

Chinese Office Action with English translation, Aug. 6, 2024, pp. 1-15, issued in Chinese Patent Application No. 202280003870.7, State Intellectual Property Office, Beijing, China.

International Search Report and Written Opinion, May 3, 2022, pp. 1-9, issued in International Application No. PCT/US22/14260, ISA/US, Alexandria, Virginia.

Zhou, T., et al., Non-CE6: Simplification with new LFNST transform basis, Jul. 3-12, 2019, pp. 1-48, JVET-O0620.

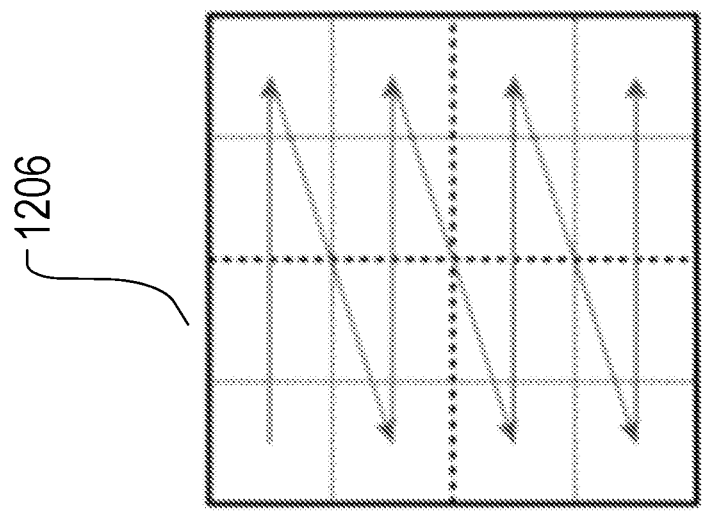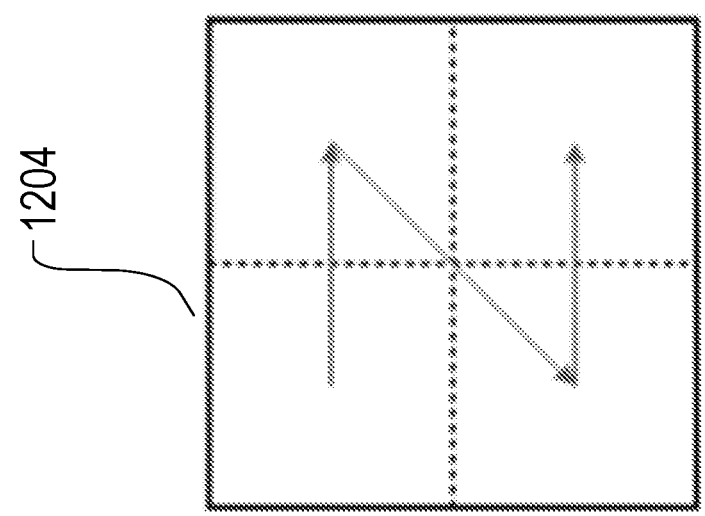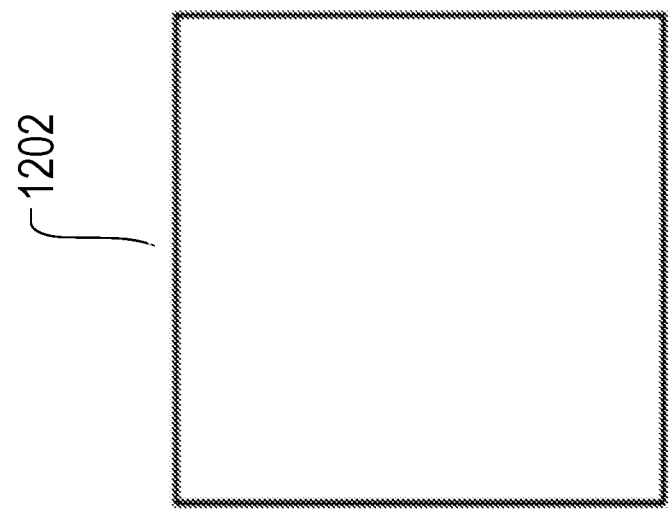
FIG. 12

ORTHOGONAL TRANSFORM GENERATION WITH SUBSPACE CONSTRAINT

INCORPORATION BY REFERENCE

This application is a continuation of and claims the benefit of priority to U.S. patent application Ser. No. 17/568,871, filed on Jan. 5, 2022, which is based on and claims the benefit of priority to U.S. Provisional Application No. 63/172,060, entitled "ORTHOGONAL TRANSFORM GENERATION WITH SUBSPACE CONSTRAINT", filed on Apr. 7, 2021. The disclosures of these prior patent applications are herein incorporate by reference in their entireties.

TECHNICAL FIELD

This disclosure describes a set of advanced video coding technologies. More specifically, the disclosed technology involves a transform kernel sharing method in video encoding and decoding.

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Video coding and decoding can be performed using inter-picture prediction with motion compensation. Uncompressed digital video can include a series of pictures, with each picture having a spatial dimension of, for example, 1920×1080 luminance samples and associated full or subsampled chrominance samples. The series of pictures can have a fixed or variable picture rate (alternatively referred to as frame rate) of, for example, 60 pictures per second or 60 frames per second. Uncompressed video has specific bitrate requirements for streaming or data processing. For example, video with a pixel resolution of 1920×1080, a frame rate of 60 frames/second, and a chroma sub sampling of 4:2:0 at 8 bit per pixel per color channel requires close to 1.5 Gbit/s bandwidth. An hour of such video requires more than 600 GBytes of storage space.

One purpose of video coding and decoding can be the reduction of redundancy in the uncompressed input video signal, through compression. Compression can help reduce the aforementioned bandwidth and/or storage space requirements, in some cases, by two orders of magnitude or more. Both lossless compression and lossy compression, as well as a combination thereof can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application albeit some information loss. In the case of video, lossy compression is widely employed in many applications. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and decoder can utilize techniques from several broad categories and steps, including, for example, motion compensation, Fourier transform, quantization, and entropy coding.

Video codec technologies can include techniques known as intra coding. In intra coding, sample values are represented without reference to samples or other data from previously reconstructed reference pictures. In some video codecs, a picture is spatially subdivided into blocks of samples. When all blocks of samples are coded in intra mode, that picture can be referred to as an intra picture. Intra pictures and their derivatives such as independent decoder refresh pictures, can be used to reset the decoder state and can, therefore, be used as the first picture in a coded video bitstream and a video session, or as a still image. The samples of a block after intra prediction can then be subject to a transform into frequency domain, and the transform coefficients so generated can be quantized before entropy coding. Intra prediction represents a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as that known from, for example, MPEG-2 generation coding technologies, does not use intra prediction. However, some newer video compression technologies include techniques that attempt coding/decoding of blocks based on, for example, surrounding sample data and/or metadata that are obtained during the encoding and/or decoding of spatially neighboring, and that precede in decoding order the blocks of data being intra coded or decoded. Such techniques are henceforth called "intra prediction" techniques. Note that in at least some cases, intra prediction uses reference data only from the current picture under reconstruction and not from other reference pictures.

There can be many different forms of intra prediction. When more than one of such techniques are available in a given video coding technology, the technique in use can be referred to as an intra prediction mode. One or more intra prediction modes may be provided in a particular codec. In certain cases, modes can have submodes and/or may be associated with various parameters, and mode/submode information and intra coding parameters for blocks of video can be coded individually or collectively included in mode codewords. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). Generally, for intra prediction, a predictor block can be formed using neighboring sample values that have become available. For example, available values of particular set of neighboring samples along certain direction and/or lines may be copied into the predictor block. A reference to the direction in use can be coded in the bitstream or may itself be predicted.

Referring to FIG. 1A, depicted in the lower right is a subset of nine predictor directions specified in H.265's 33 possible intra predictor directions (corresponding to the 33 angular modes of the 35 intra modes specified in H.265). The point where the arrows converge (101) represents the sample being predicted. The arrows represent the direction from which neighboring samples are used to predict the sample at 101. For example, arrow (102) indicates that sample (101) is predicted from a neighboring sample or samples to the upper right, at a 45 degree angle from the horizontal direction. Similarly, arrow (103) indicates that sample (101) is predicted from a neighboring sample or samples to the lower left of sample (101), in a 22.5 degree angle from the horizontal direction.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are example reference samples that follow a similar numbering scheme. A reference sample is labelled with an R, its Y position (e.g., row index) and X position (column index) relative to block (104). In both H.264 and H.265, prediction samples adjacently neighboring the block under reconstruction are used.

Intra picture prediction of block 104 may begin by copying reference sample values from the neighboring samples according to a signaled prediction direction. For example, assuming that the coded video bitstream includes signaling that, for this block 104, indicates a prediction direction of arrow (102)—that is, samples are predicted from a prediction sample or samples to the upper right, at a 45-degree angle from the horizontal direction. In such a case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has continued to develop. In H.264 (year 2003), for example, nine different direction are available for intra prediction. That increased to 33 in H.265 (year 2013), and JEM/VVC/BMS, at the time of this disclosure, can support up to 65 directions. Experimental studies have been conducted to help identify the most suitable intra prediction directions, and certain techniques in the entropy coding may be used to encode those most suitable directions in a small number of bits, accepting a certain bit penalty for directions. Further, the directions themselves can sometimes be predicted from neighboring directions used in the intra prediction of the neighboring blocks that have been decoded.

FIG. 1B shows a schematic (180) that depicts 65 intra prediction directions according to JEM to illustrate the increasing number of prediction directions in various encoding technologies developed over time.

The manner for mapping of bits representing intra prediction directions to the prediction directions in the coded video bitstream may vary from video coding technology to video coding technology; and can range, for example, from simple direct mappings of prediction direction to intra prediction mode, to codewords, to complex adaptive schemes involving most probable modes, and similar techniques. In all cases, however, there can be certain directions for intro prediction that are statistically less likely to occur in video content than certain other directions. As the goal of video compression is the reduction of redundancy, those less likely directions will, in a well-designed video coding technology, may be represented by a larger number of bits than more likely directions.

Inter picture prediction, or inter prediction may be based on motion compensation. In motion compensation, sample data from a previously reconstructed picture or part thereof (reference picture), after being spatially shifted in a direction indicated by a motion vector (MV henceforth), may be used for a prediction of a newly reconstructed picture or picture part (e.g., a block). In some cases, the reference picture can be the same as the picture currently under reconstruction. MVs may have two dimensions X and Y, or three dimensions, with the third dimension being an indication of the reference picture in use (akin to a time dimension).

In some video compression techniques, a current MV applicable to a certain area of sample data can be predicted from other MVs, for example from those other MVs that are related to other areas of the sample data that are spatially adjacent to the area under reconstruction and precede the current MV in decoding order. Doing so can substantially reduce the overall amount of data required for coding the MVs by relying on removing redundancy in correlated MVs, thereby increasing compression efficiency. MV prediction can work effectively, for example, because when coding an input video signal derived from a camera (known as natural video) there is a statistical likelihood that areas larger than the area to which a single MV is applicable move in a similar direction in the video sequence and, therefore, can in some cases be predicted using a similar motion vector derived from MVs of neighboring area. That results in the actual MV for a given area to be similar or identical to the MV predicted from the surrounding MVs. Such an MV in turn may be represented, after entropy coding, in a smaller number of bits than what would be used if the MV is coded directly rather than predicted from the neighboring MV(s). In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 specifies, described below is a technique henceforth referred to as "spatial merge".

Specifically, referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block uses.

SUMMARY

Aspects of the disclosure provide methods and apparatuses for transform kernel sharing in video encoding and decoding.

In some implementations, a method is disclosed for such transform kernel sharing. The method may include identifying a plurality of transform kernels, wherein each of the plurality of transform kernels comprises a set of basis vectors from low to high frequencies; N high-frequency basis vectors of two or more of the plurality of transform kernels are shared, N being a positive integer; and low-frequency basis vectors of the two or more of the plurality of the transform kernels other than the N high-frequency basis vectors are individualized. The method may further include extracting a data block from a video bitstream; selecting a transform kernel from the plurality of transform kernels based on information associated with the data block; and applying the transform kernel to at least a portion of the data block to generate a transformed block.

In the implementations above, the plurality of transform kernels may be pre-trained offline. In some further implementations, the plurality of transform kernels may be jointly trained offline to determine the N high-frequency basis vector being shared.

In any of the implementations above, the N high-frequency basis vectors may include basis vectors with frequencies higher than a predetermined threshold frequency. In some further implementations, the plurality of transform kernels and the predetermined threshold frequency may be pre-trained offline.

In any of the implementations above, the plurality of transform kernels may include secondary transform kernels applicable to transforming primary transform coefficients, and the data block comprises an array of primary transform coefficients.

In any of the implementations above, the two or more of the plurality of transform kernels sharing the N high-frequency basis vectors correspond to a same one of a plurality of intra-picture prediction modes; and all transform kernels among the plurality of the transform kernels assigned to the same one of the plurality of intra-picture prediction modes share the N high-frequency basis vectors with other low-frequency basis vectors being individualized.

In any of the implementations above, the two or more of the plurality of transform kernels sharing the N high-frequency basis vectors may be assigned to two or more different intra-picture prediction modes.

In any of the implementations above, the plurality of transform kernels are secondary transform kernels; and the two or more of the plurality of transform kernels sharing the N high-frequency basis vector are configured to transform primary transform coefficients generated from primary transforms having a same transform type.

In any of the implementations above, N is an integer power of 2, and/or N is smaller than a predefined upper bound, and/or N depends on a transform size.

In any of the implementations above, the plurality of transform kernels may be configured for intra secondary transform (IST). In some implementations, the plurality of transform kernels may be secondary low frequency non-separable transform (LFNST) kernels. In some implementations, the plurality of transform kernels are configured for line graph transform (LGT).

In some other implementations, a device for processing video information is disclosed. The device may include a circuitry configured to perform any one of the method implementations above.

Aspects of the disclosure also provide non-transitory computer-readable mediums storing instructions which when executed by a computer for video decoding and/or encoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIG. 12 shows transform block partitioning and scan of an intra prediction block according to example embodiments of the disclosure.

DETAILED DESCRIPTION OF EMBODIMENTS

Figure 3:
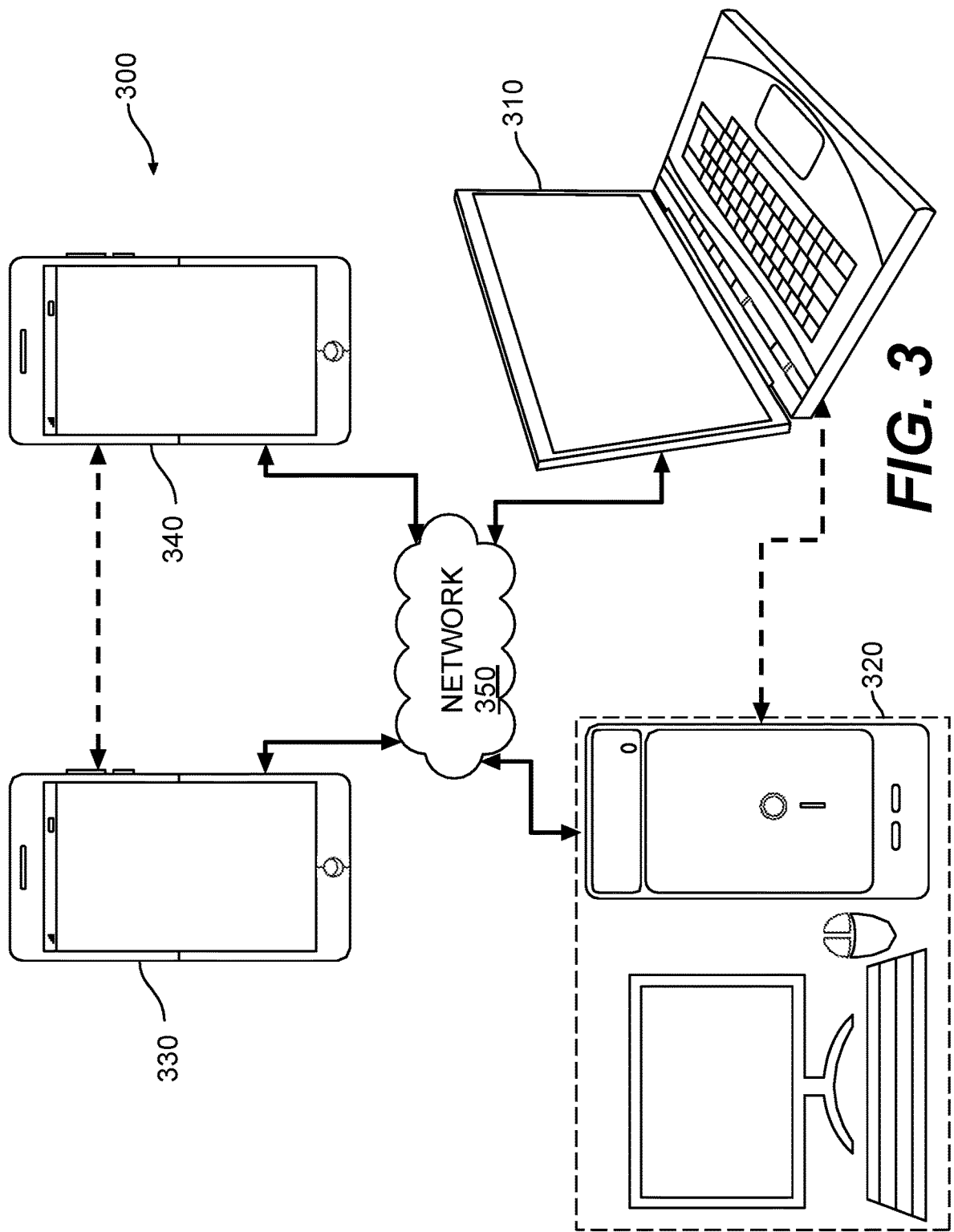
FIG. 3 shows a schematic illustration of a simplified block diagram of a communication system (300) in accordance with an example embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the example of FIG. 3, the first pair of terminal devices (310) and (320) may perform unidirectional transmission of data. For example, the terminal device (310) may code video data (e.g., of a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display the video pictures according to the recovered video data. Unidirectional data transmission may be implemented in media serving applications and the like.

In another example, the communication system (300) includes a second pair of terminal devices (330) and (340) that perform bidirectional transmission of coded video data that may be implemented, for example, during a videoconferencing application. For bidirectional transmission of data, in an example, each terminal device of the terminal devices (330) and (340) may code video data (e.g., of a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display the video pictures at an accessible display device according to the recovered video data.

In the example of FIG. 3, the terminal devices (310), (320), (330) and (340) may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (350) represents any number or types of networks that convey coded video data among the terminal devices (310), (320), (330) and (340), including for example wireline (wired) and/or wireless communication networks. The communication network (350) may exchange data in circuit-switched, packet-switched, and/or other types of channels. Representative networks include telecommunications networks, local area networks, wide area networks and/or the Internet. For the purposes of the present discussion, the architecture and topology of the network (350) may be immaterial to the operation of the present disclosure unless explicitly explained herein.

Figure 4:
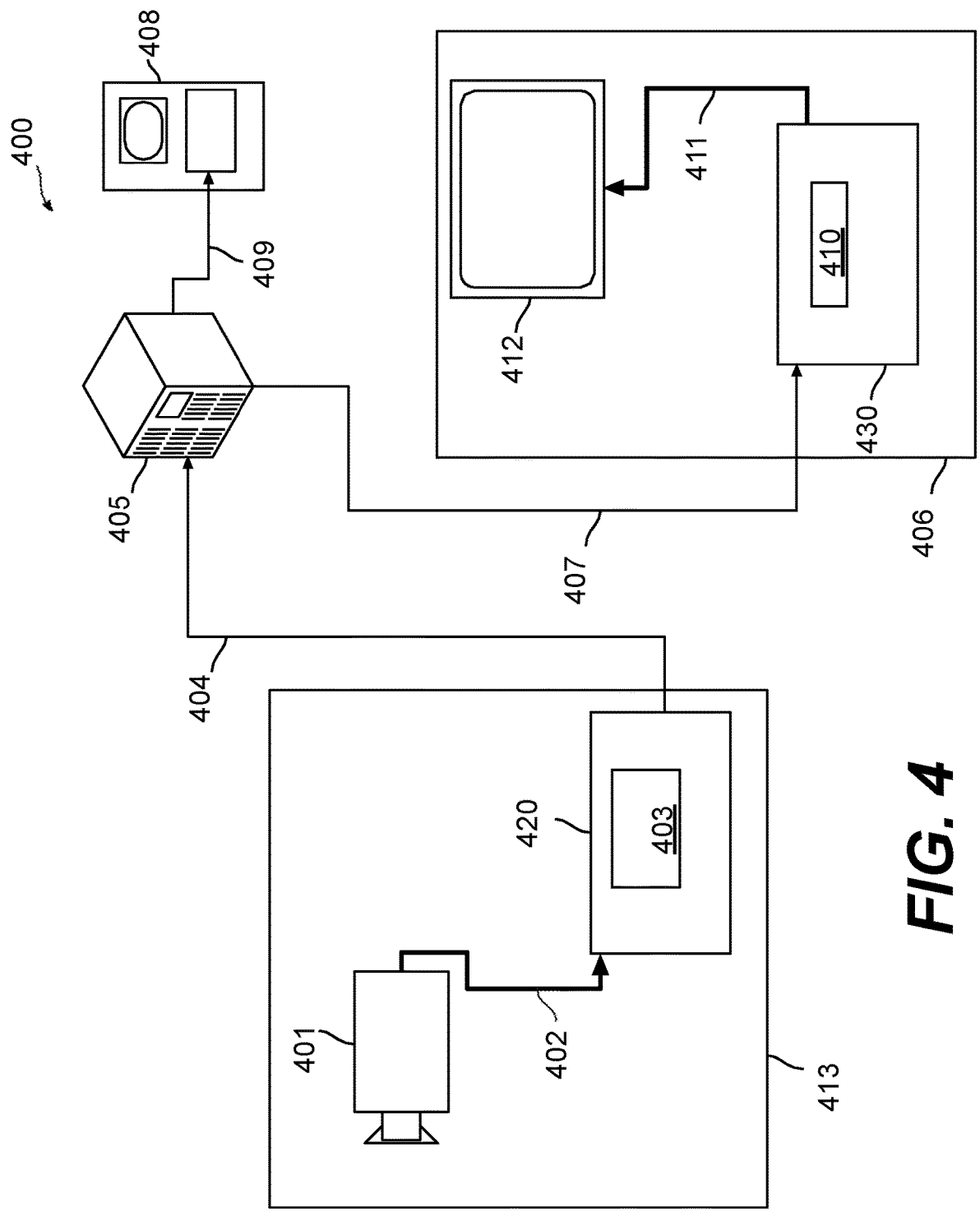
FIG. 4 shows a schematic illustration of a simplified block diagram of a communication system (400) in accordance with an example embodiment.

FIG. 4 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

A video streaming system may include a video capture subsystem (413) that can include a video source (401), e.g., a digital camera, for creating a stream of video pictures or images (402) that are uncompressed. In an example, the stream of video pictures (402) includes samples that are recorded by a digital camera of the video source 401. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize a lower data volume when compared to the stream of uncompressed video pictures (402), can be stored on a streaming server (405) for future use or directly to downstream video devices (not shown). One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that are uncompressed and that can be rendered on a display (412) (e.g., a display screen) or other rendering devices (not depicted). The video decoder 410 may be configured to perform some or all of the various functions described in this disclosure. In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC, and other video coding standards.

It is noted that the electronic devices (420) and (430) can include other components (not shown). For example, the electronic device (420) can include a video decoder (not shown) and the electronic device (430) can include a video encoder (not shown) as well.

Figure 5:
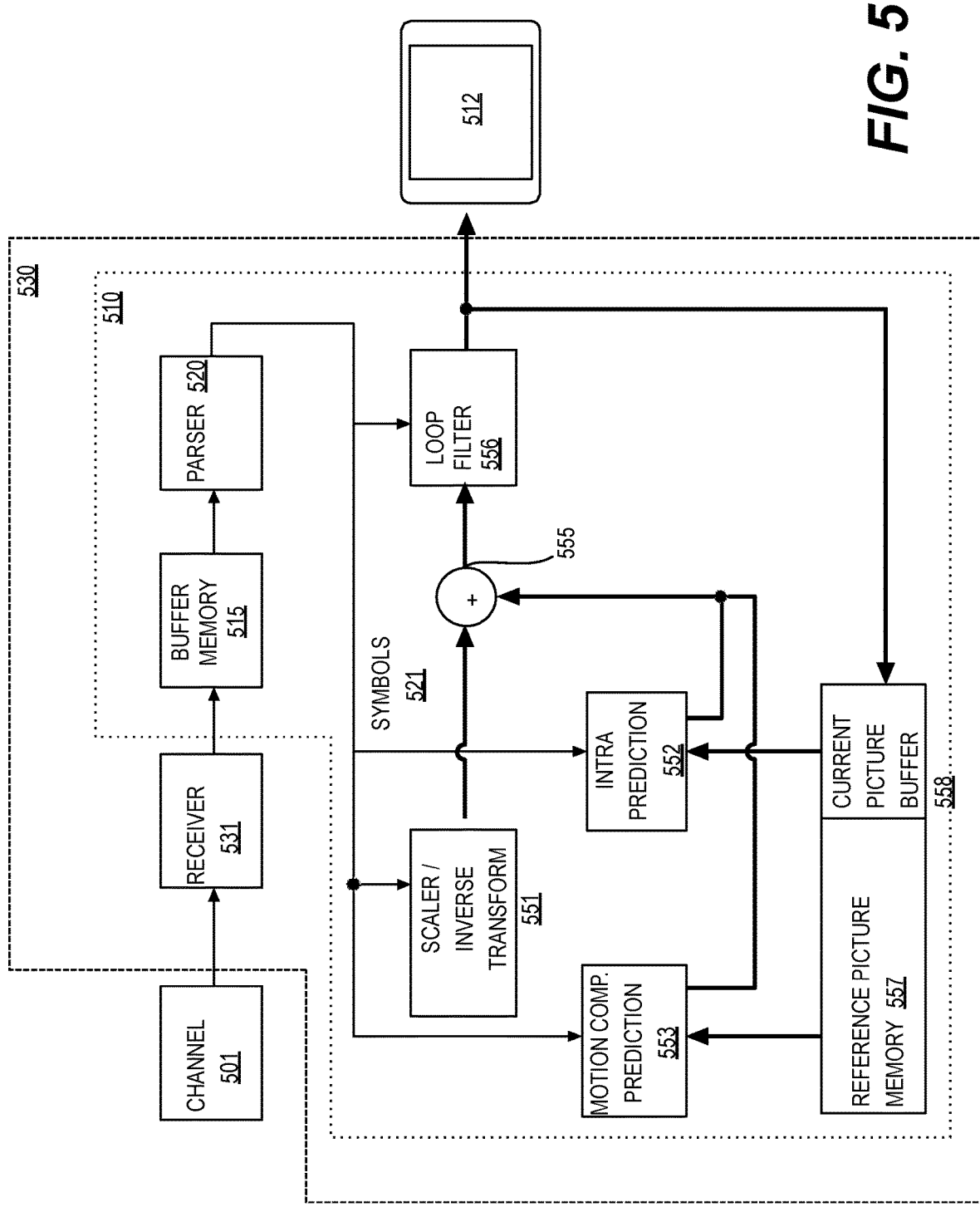
FIG. 5 shows a schematic illustration of a simplified block diagram of a video decoder in accordance with an example embodiment.

FIG. 5 shows a block diagram of a video decoder (510) according to any embodiment of the present disclosure below. The video decoder (510) can be included in an electronic device (530). The electronic device (530) can include a receiver (531) (e.g., receiving circuitry). The video decoder (510) can be used in place of the video decoder (410) in the example of FIG. 4.

The receiver (531) may receive one or more coded video sequences to be decoded by the video decoder (510). In the same or another embodiment, one coded video sequence may be decoded at a time, where the decoding of each coded video sequence is independent from other coded video sequences. Each video sequence may be associated with multiple video frames or images. The coded video sequence may be received from a channel (501), which may be a hardware/software link to a storage device which stores the encoded video data or a streaming source which transmits the encoded video data. The receiver (531) may receive the encoded video data with other data such as coded audio data and/or ancillary data streams, that may be forwarded to their respective processing circuitry (not depicted). The receiver (531) may separate the coded video sequence from the other data. To combat network jitter, a buffer memory (515) may be disposed in between the receiver (531) and an entropy decoder/parser (520) ("parser (520)" henceforth). In certain applications, the buffer memory (515) may be implemented as part of the video decoder (510). In other applications, it can be outside of and separate from the video decoder (510)

(not depicted). In still other applications, there can be a buffer memory (not depicted) outside of the video decoder (510) for the purpose of, for example, combating network jitter, and there may be another additional buffer memory (515) inside the video decoder (510), for example to handle playback timing. When the receiver (531) is receiving data from a store/forward device of sufficient bandwidth and controllability, or from an isosynchronous network, the buffer memory (515) may not be needed, or can be small. For use on best-effort packet networks such as the Internet, the buffer memory (515) of sufficient size may be required, and its size can be comparatively large. Such buffer memory may be implemented with an adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as display (512) (e.g., a display screen) that may or may not an integral part of the electronic device (530) but can be coupled to the electronic device (530), as is shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received by the parser (520). The entropy coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the subgroups. The subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients (e.g., Fourier transform coefficients), quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different processing or functional units depending on the type of the coded video picture or parts thereof (such as: inter and intra picture, inter and intra block), and other factors. The units that are involved and how they are involved may be controlled by the subgroup control information that was parsed from the coded video sequence by the parser (520). The flow of such subgroup control information between the parser (520) and the multiple processing or functional units below is not depicted for simplicity.

Beyond the functional blocks already mentioned, the video decoder (510) can be conceptually subdivided into a number of functional units as described below. In a practical implementation operating under commercial constraints, many of these functional units interact closely with each other and can, at least partly, be integrated with one another. However, for the purpose of describing the various functions of the disclosed subject matter with clarity, the conceptual subdivision into the functional units is adopted in the disclosure below.

A first unit may include the scaler/inverse transform unit (551). The scaler/inverse transform unit (551) may receive a quantized transform coefficient as well as control information, including information indicating which type of inverse transform to use, block size, quantization factor/parameters, quantization scaling matrices, and the lie as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block, i.e., a block that does not use predictive information from previously reconstructed pictures, but can use predictive information from previously reconstructed parts of the current picture. Such predictive information can be provided by an intra picture prediction unit (552). In some cases, the intra picture prediction unit (552) may generate a block of the same size and shape of the block under reconstruction using surrounding block information that is already reconstructed and stored in the current picture buffer (558). The current picture buffer (558) buffers, for example, partly reconstructed current picture and/or fully reconstructed current picture. The aggregator (555), in some implementations, may add, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for inter-picture prediction. After motion compensating the fetched samples in accordance with the symbols (521) pertaining to the block, these samples can be added by the aggregator (555) to the output of the scaler/inverse transform unit (551) (output of unit 551 may be referred to as the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y components (shift), and reference picture components (time). Motion compensation may also include interpolation of sample values as fetched from the reference picture memory (557) when sub-sample exact motion vectors are in use, and may also be associated with motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values. Several type of loop filters may be included as part of the loop filter unit 556 in various orders, as will be described in further detail below.

The output of the loop filter unit (556) can be a sample stream that can be output to the rendering device (512) as well as stored in the reference picture memory (557) for use in future inter-picture prediction.

Certain coded pictures, once fully reconstructed, can be used as reference pictures for future inter-picture prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology adopted in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools from all the tools available in the video compression technology or standard as the only tools available for use under that profile. To be standard-compliant, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In some example embodiments, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
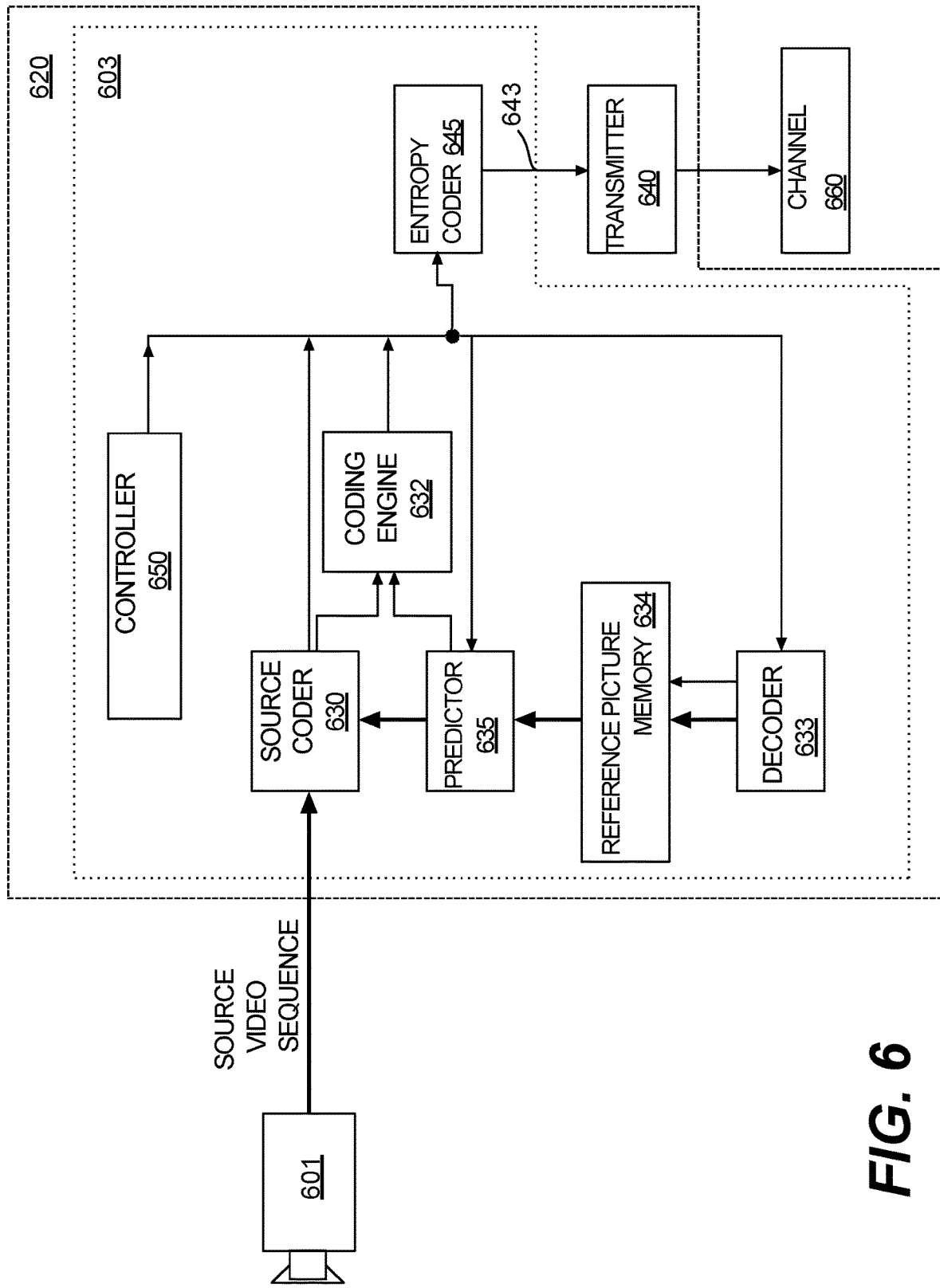
FIG. 6 shows a schematic illustration of a simplified block diagram of a video encoder in accordance with an example embodiment.

FIG. 6 shows a block diagram of a video encoder (603) according to an example embodiment of the present disclosure. The video encoder (603) may be included in an electronic device (620). The electronic device (620) may further include a transmitter (640) (e.g., transmitting circuitry). The video encoder (603) can be used in place of the video encoder (403) in the example of FIG. 4.

The video encoder (603) may receive video samples from a video source (601) (that is not part of the electronic device (620) in the example of FIG. 6) that may capture video image(s) to be coded by the video encoder (603). In another example, the video source (601) may be implemented as a portion of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 YCrCb, RGB, XYZ . . . ), and any suitable sampling structure (for example YCrCb 4:2:0, YCrCb 4:4:4). In a media serving system, the video source (601) may be a storage device capable of storing previously prepared video. In a videoconferencing system, the video source (601) may be a camera that captures local image information as a video sequence. Video data may be provided as a plurality of individual pictures or images that impart motion when viewed in sequence. The pictures themselves may be organized as a spatial array of pixels, wherein each pixel can comprise one or more samples depending on the sampling structure, color space, and the like being in use. A person having ordinary skill in the art can readily understand the relationship between pixels and samples. The description below focuses on samples.

According to some example embodiments, the video encoder (603) may code and compress the pictures of the source video sequence into a coded video sequence (643) in real time or under any other time constraints as required by the application. Enforcing appropriate coding speed constitutes one function of a controller (650). In some embodiments, the controller (650) may be functionally coupled to and control other functional units as described below. The coupling is not depicted for simplicity. Parameters set by the controller (650) can include rate control related parameters (picture skip, quantizer, lambda value of rate-distortion optimization techniques, . . . ), picture size, group of pictures (GOP) layout, maximum motion vector search range, and the like. The controller (650) can be configured to have other suitable functions that pertain to the video encoder (603) optimized for a certain system design.

In some example embodiments, the video encoder (603) may be configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder would create even though the embedded decoder 633 process coded video steam by the source coder 630 without entropy coding (as any compression between symbols and coded video bitstream in entropy coding may be lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used to improve coding quality.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633) in the encoder.

An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (630) may perform motion compensated predictive coding, which codes an input picture predictively with reference to one or more previously coded picture from the video sequence that were designated as "reference pictures." In this manner, the coding engine (632) codes differences (or residue) in the color channels between pixel blocks of an input picture and pixel blocks of reference picture(s) that may be selected as prediction reference(s) to the input picture. The term "residue" and its adjective form "residual" may be used interchangeably.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end (remote) video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compression of the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person having ordinary skill in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample coding blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures. The source pictures or the intermediate processed pictures may be subdivided into other types of blocks for other purposes. The division of coding blocks and the other types of blocks may or may not follow the same manner, as described in further detail below.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data may accordingly conform to a syntax specified by the video coding technology or standard being used.

In some example embodiments, the transmitter (640) may transmit additional data with the encoded video. The source coder (630) may include such data as part of the coded video sequence. The additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) utilizes spatial correlation in a given picture, and inter-picture prediction utilizes temporal or other correlation between the pictures. For example, a specific picture under encoding/decoding, which is referred to as a current picture, may be partitioned into blocks. A block in the current picture, when similar to a reference block in a previously coded and still buffered reference picture in the video, may be coded by a vector that is referred to as a motion vector. The motion vector points to the reference block in the reference picture, and can have a third dimension identifying the reference picture, in case multiple reference pictures are in use.

In some example embodiments, a bi-prediction technique can be used for inter-picture prediction. According to such bi-prediction technique, two reference pictures, such as a first reference picture and a second reference picture that both proceed the current picture in the video in decoding order (but may be in the past or future, respectively, in display order) are used. A block in the current picture can be coded by a first motion vector that points to a first reference block in the first reference picture, and a second motion vector that points to a second reference block in the second reference picture. The block can be jointly predicted by a combination of the first reference block and the second reference block.

Further, a merge mode technique may be used in the inter-picture prediction to improve coding efficiency.

According to some example embodiments of the disclosure, predictions, such as inter-picture predictions and intra-picture predictions are performed in the unit of blocks. For example, a picture in a sequence of video pictures is partitioned into coding tree units (CTU) for compression, the CTUs in a picture may have the same size, such as 64×64 pixels, 32×32 pixels, or 16×16 pixels. In general, a CTU may include three parallel coding tree blocks (CTBs): one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels. Each of the one or more of the 32×32 block may be further split into 4 CUs of 16×16 pixels. In some example embodiments, each CU may be analyzed during encoding to determine a prediction type for the CU among various prediction types such as an inter prediction type or an intra prediction type. The CU may be split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. The split of a CU into PU (or PBs of different color channels) may be performed in various spatial pattern. A luma or chroma PB, for example, may include a matrix of values (e.g., luma values) for samples, such as 8×8 pixels, 16×16 pixels, 8×16 pixels, 16×8 samples, and the like.

Figure 7:
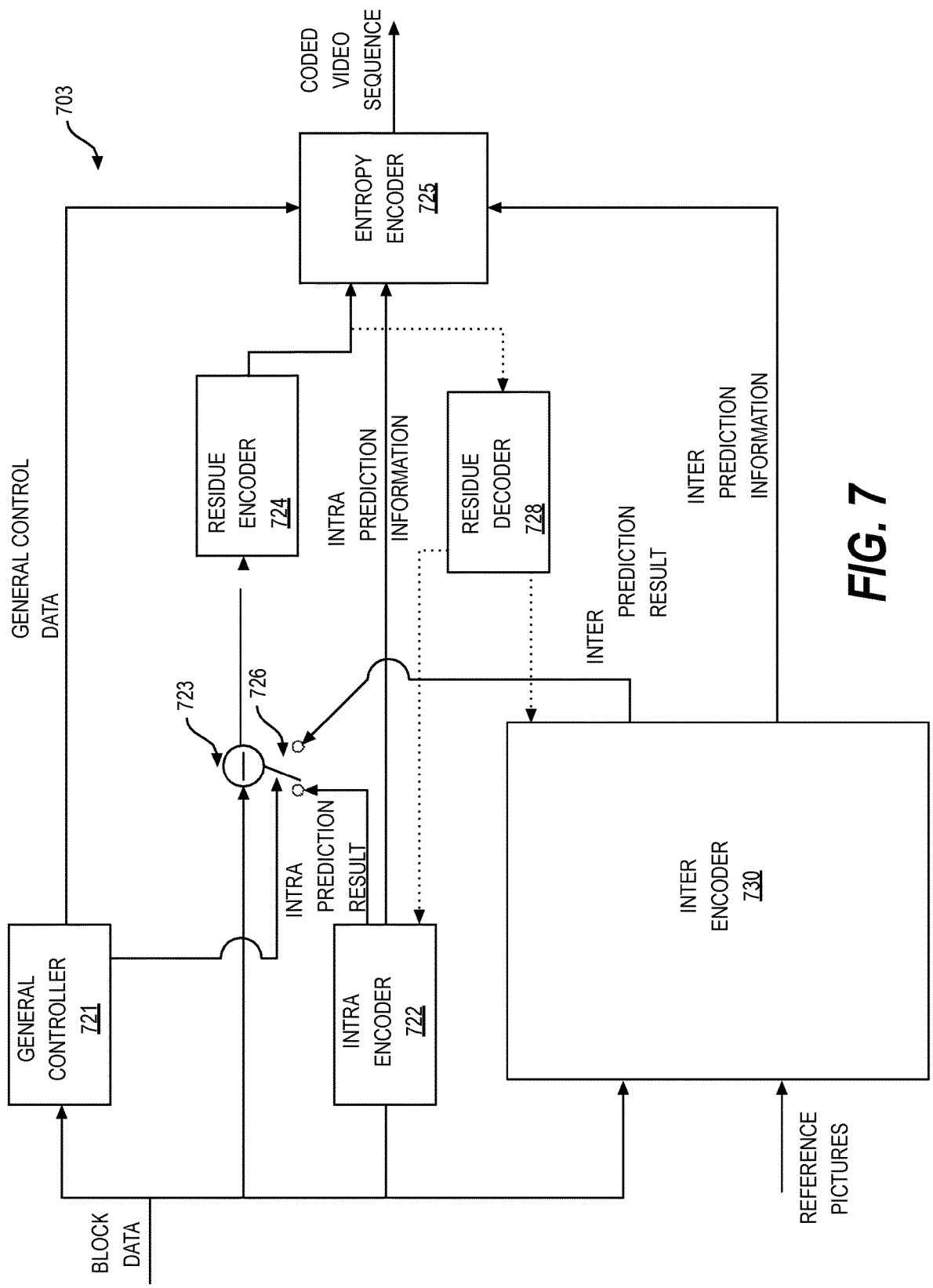
FIG. 7 shows a block diagram of a video encoder in accordance with another example embodiment.

FIG. 7 shows a diagram of a video encoder (703) according to another example embodiment of the disclosure. The video encoder (703) is configured to receive a processing block (e.g., a prediction block) of sample values within a current video picture in a sequence of video pictures, and encode the processing block into a coded picture that is part of a coded video sequence. The example video encoder (703) may be used in place of the video encoder (403) in the FIG. 4 example.

For example, the video encoder (703) receives a matrix of sample values for a processing block, such as a prediction block of 8×8 samples, and the like. The video encoder (703) then determines whether the processing block is best coded using intra mode, inter mode, or bi-prediction mode using, for example, rate-distortion optimization (RDO). When the processing block is determined to be coded in intra mode, the video encoder (703) may use an intra prediction technique to encode the processing block into the coded picture; and when the processing block is determined to be coded in inter mode or bi-prediction mode, the video encoder (703) may use an inter prediction or bi-prediction technique, respectively, to encode the processing block into the coded picture. In some example embodiments, a merge mode may be used as a submode of the inter picture prediction where the motion vector is derived from one or more motion vector predictors without the benefit of a coded motion vector component outside the predictors. In some other example embodiments, a motion vector component applicable to the subject block may be present. Accordingly, the video encoder (703) may include components not explicitly shown in FIG. 7, such as a mode decision module, to determine the perdition mode of the processing blocks.

In the example of FIG. 7, the video encoder (703) includes an inter encoder (730), an intra encoder (722), a residue calculator (723), a switch (726), a residue encoder (724), a general controller (721), and an entropy encoder (725) coupled together as shown in the example arrangement in FIG. 7.

The inter encoder (730) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information using the decoding unit 633 embedded in the example encoder 620 of FIG. 6 (shown as residual decoder 728 of FIG. 7, as described in further detail below).

The intra encoder (722) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques). The intra encoder (722) may calculates intra prediction results (e.g., predicted block) based on the intra prediction information and reference blocks in the same picture.

The general controller (721) may be configured to determine general control data and control other components of the video encoder (703) based on the general control data. In an example, the general controller (721) determines the prediction mode of the block, and provides a control signal to the switch (726) based on the prediction mode. For example, when the prediction mode is the intra mode, the general controller (721) controls the switch (726) to select the intra mode result for use by the residue calculator (723), and controls the entropy encoder (725) to select the intra prediction information and include the intra prediction information in the bitstream; and when the predication mode for the block is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) may be configured to calculate a difference (residue data) between the received block and prediction results for the block selected from the intra encoder (722) or the inter encoder (730). The residue encoder (724) may be configured to encode the residue data to generate transform coefficients. For example, the residue encoder (724) may be configured to convert the residue data from a spatial domain to a frequency domain to generate the transform coefficients. The transform coefficients are then subject to quantization processing to obtain quantized transform coefficients. In various example embodiments, the video encoder (703) also includes a residual decoder (728). The residual decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures.

The entropy encoder (725) may be configured to format the bitstream to include the encoded block and perform entropy coding. The entropy encoder (725) is configured to include in the bitstream various information. For example, the entropy encoder (725) may be configured to include the general control data, the selected prediction information (e.g., intra prediction information or inter prediction information), the residue information, and other suitable information in the bitstream. When coding a block in the merge submode of either inter mode or bi-prediction mode, there may be no residue information.

Figure 8:
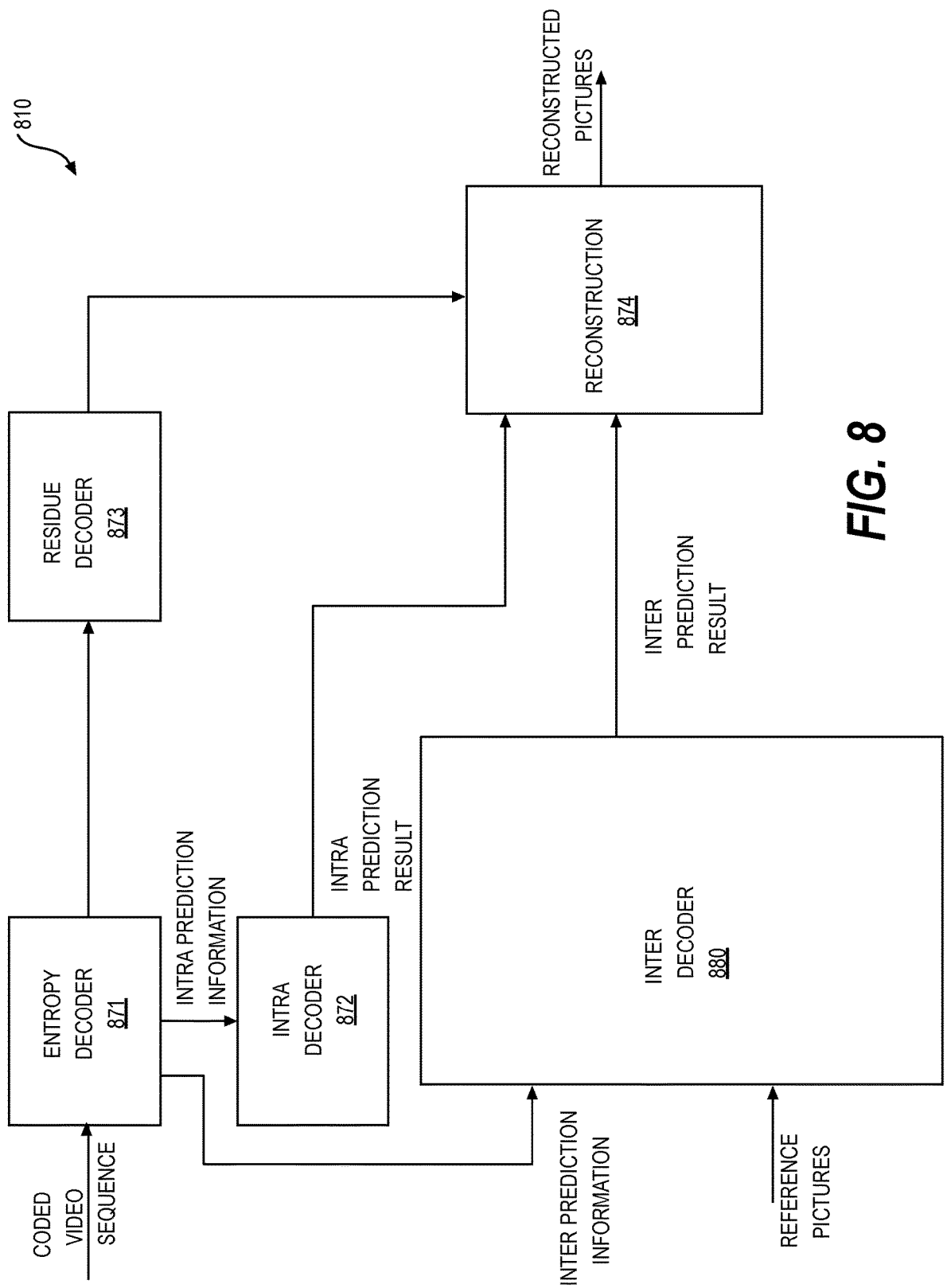
FIG. 8 shows a block diagram of a video decoder in accordance with another example embodiment.

FIG. 8 shows a diagram of an example video decoder (810) according to another embodiment of the disclosure. The video decoder (810) is configured to receive coded pictures that are part of a coded video sequence, and decode the coded pictures to generate reconstructed pictures. In an example, the video decoder (810) may be used in place of the video decoder (410) in the example of FIG. 4.

In the example of FIG. 8, the video decoder (810) includes an entropy decoder (871), an inter decoder (880), a residual decoder (873), a reconstruction module (874), and an intra decoder (872) coupled together as shown in the example arrangement of FIG. 8.

The entropy decoder (871) can be configured to reconstruct, from the coded picture, certain symbols that represent the syntax elements of which the coded picture is made up. Such symbols can include, for example, the mode in which a block is coded (e.g., intra mode, inter mode, bi-predicted mode, merge submode or another submode), prediction information (e.g., intra prediction information or inter prediction information) that can identify certain sample or metadata used for prediction by the intra decoder (872) or the inter decoder (880), residual information in the form of, for example, quantized transform coefficients, and the like. In an example, when the prediction mode is the inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residual decoder (873).

The inter decoder (880) may be configured to receive the inter prediction information, and generate inter prediction results based on the inter prediction information.

The intra decoder (872) may be configured to receive the intra prediction information, and generate prediction results based on the intra prediction information.

The residual decoder (873) may be configured to perform inverse quantization to extract de-quantized transform coefficients, and process the de-quantized transform coefficients to convert the residual from the frequency domain to the spatial domain. The residual decoder (873) may also utilize certain control information (to include the Quantizer Parameter (QP)) which may be provided by the entropy decoder (871) (data path not depicted as this may be low data volume control information only).

The reconstruction module (874) may be configured to combine, in the spatial domain, the residual as output by the residual decoder (873) and the prediction results (as output by the inter or intra prediction modules as the case may be) to form a reconstructed block forming part of the reconstructed picture as part of the reconstructed video. It is noted that other suitable operations, such as a deblocking operation and the like, may also be performed to improve the visual quality.

It is noted that the video encoders (403), (603), and (703), and the video decoders (410), (510), and (810) can be implemented using any suitable technique. In some example embodiments, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Returning to the intra prediction process, in which samples in a block (e.g., a luma or chroma prediction block, or coding block if not further split into prediction blocks) is predicted by samples of neighboring, next neighboring, or other line or lines, or the combination thereof, to generate a prediction block. The residual between the actual block being coded and the prediction block may then be processed via transform followed by quantization. Various intra prediction modes may be made available and parameters related to intra mode selection and other parameters may be signaled in the bitstream. The various intra prediction modes, for example, may pertain to line position or positions for predicting samples, directions along which prediction samples are selected from predicting line or lines, and other special intra prediction modes.

Figure 1A:
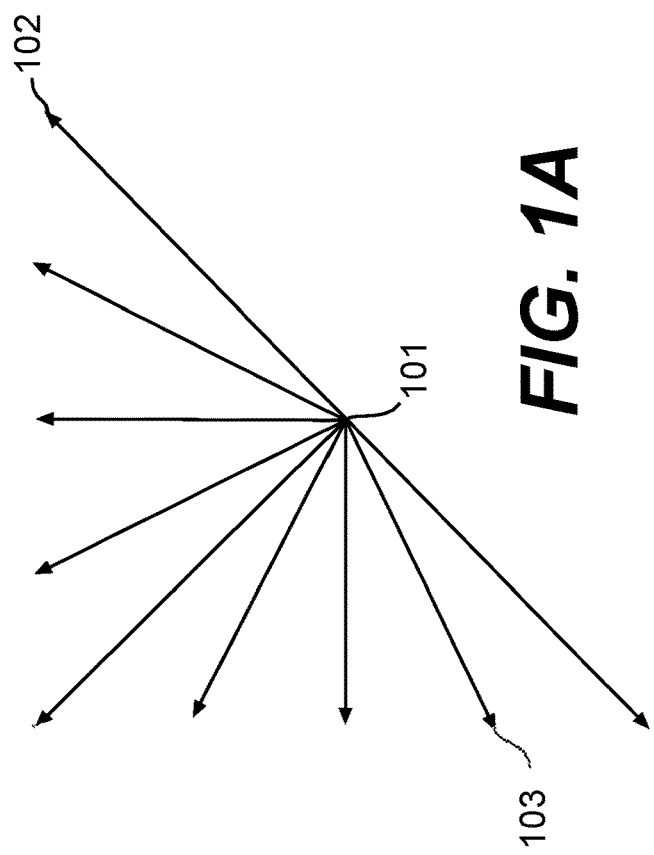
FIG. 1A shows a schematic illustration of an exemplary subset of intra prediction directional modes.
Figure 1B:
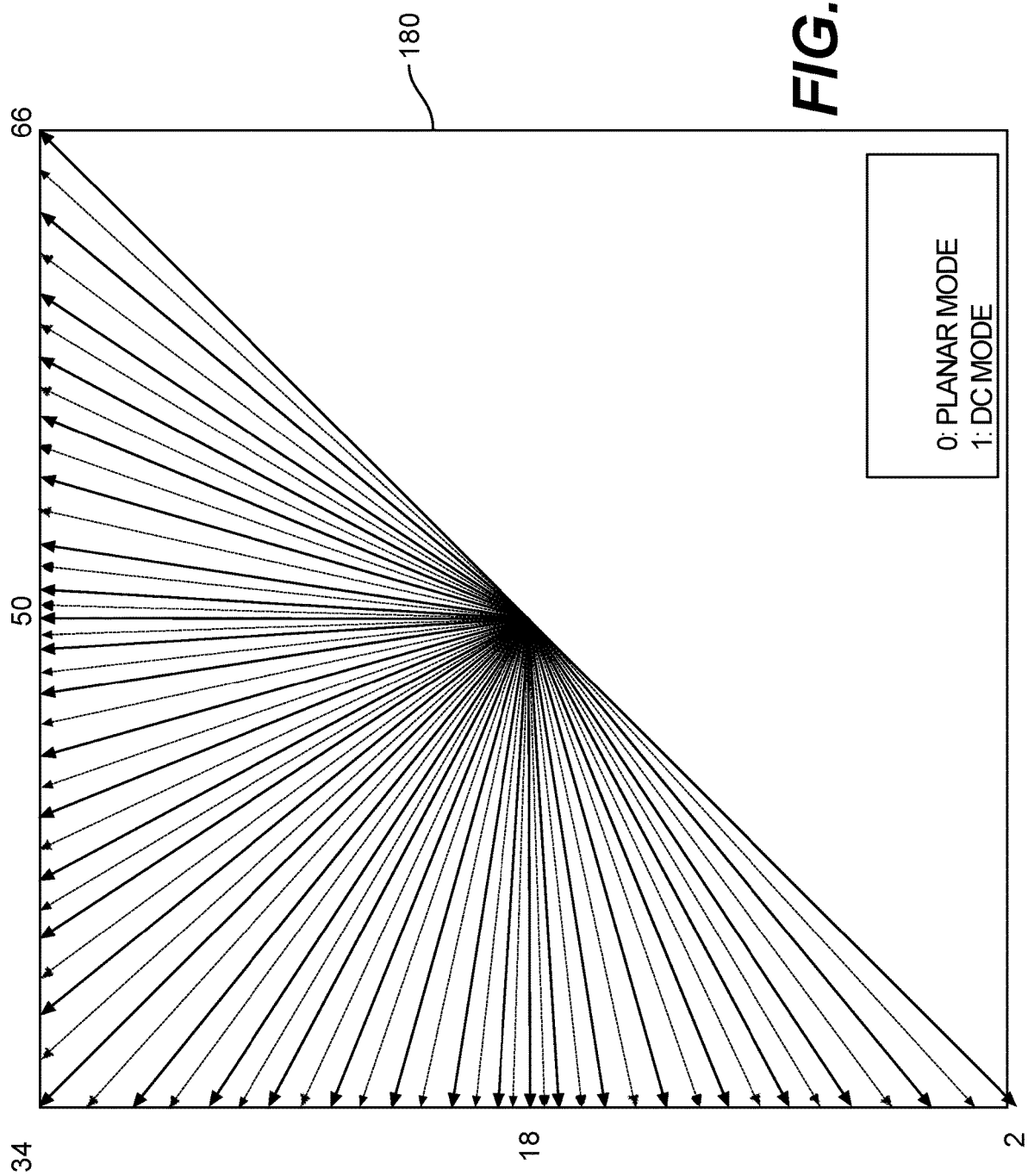
FIG. 1B shows an illustration of exemplary intra prediction directions.
Figure 2:
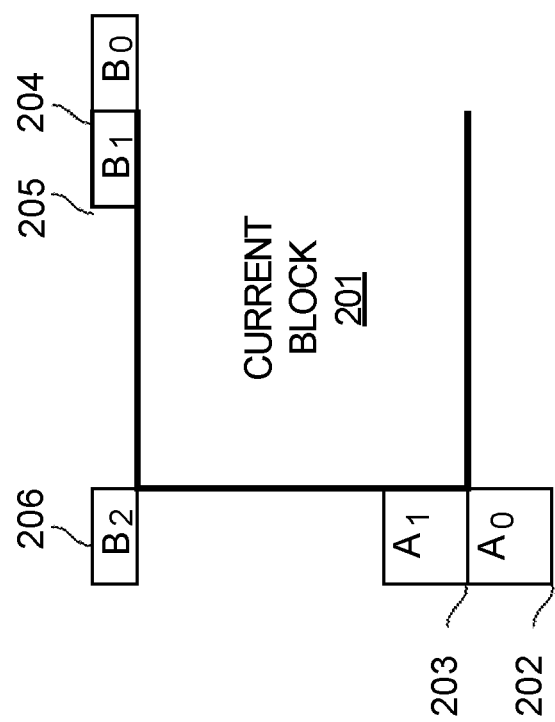
FIG. 2 shows a schematic illustration of a current block and its surrounding spatial merge candidates for motion vector prediction in one example.

For example, a set of intra prediction modes (interchangeably referred to as "intra modes") may include a predefined number of directional intra prediction modes. As described above in relation to the example implementation of FIG. 1, these intra prediction modes may correspond to a predefined number of directions along which out-of-block samples are selected as prediction for samples being predicted in a particular block. In another particular example implementation, eight (8) main directional modes corresponding to angles from 45 to 207 degrees to the horizontal axis may be supported and predefined.

Figure 9:
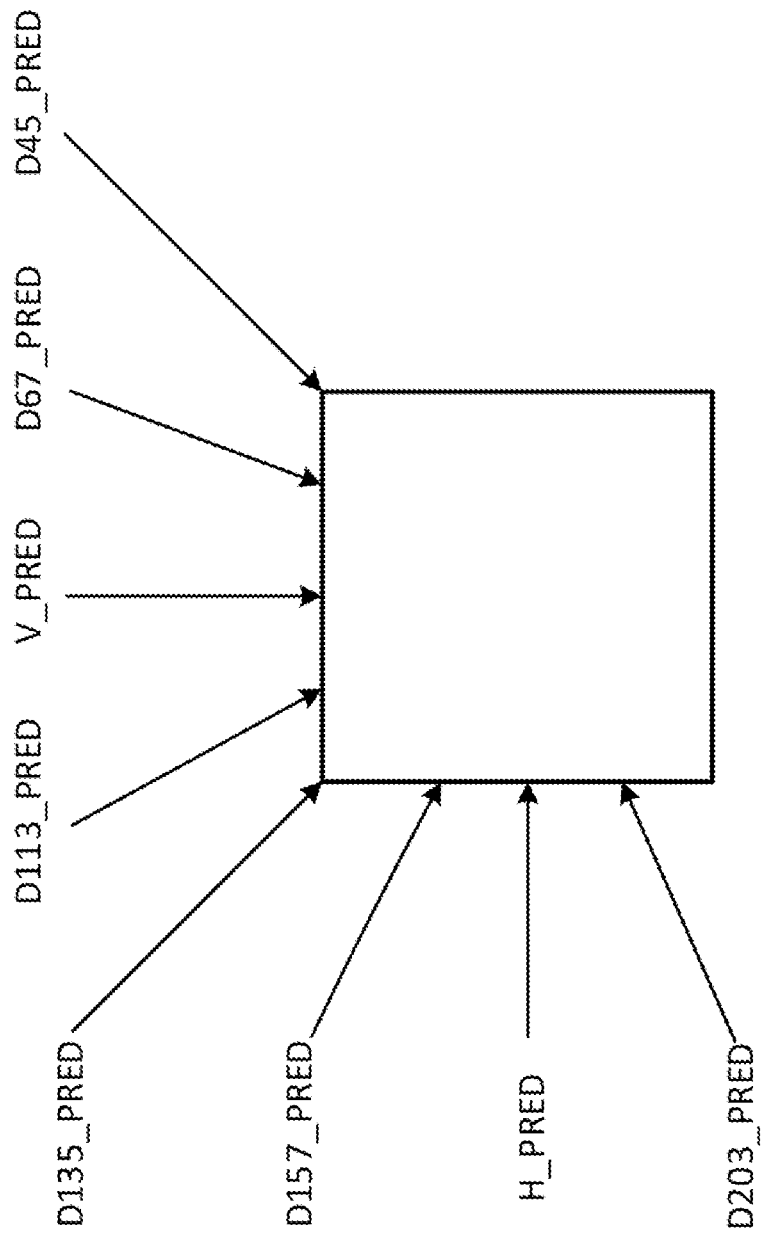
FIG. 9 shows directional intra prediction modes according to example embodiments of the disclosure.

In some other implementations of intra prediction, to further exploit more varieties of spatial redundancy in directional textures, directional intra modes may be further extended to an angle set with finer granularity. For example, the 8-angle implementation above may be configured to provide eight nominal angles, referred to as V_PRED, H_PRED, D45_PRED, D135_PRED, D113_PRED, D157_PRED, D203_PRED, and D67_PRED, as illustrated in FIG. 9, and for each nominal angle, a predefined number (e.g., 7) of finer angles may be added. With such an extension, a larger total number (e.g., 56 in this example) of directional angles may be available for intra prediction, corresponding to the same number of predefined directional intra modes. A prediction angle may be represented by a nominal intra angle plus an angle delta. For the particular example above with 7 finer angular directions for each nominal angle, the angle delta may be −3~3 multiplies a step size of 3 degrees.

Figure 10:
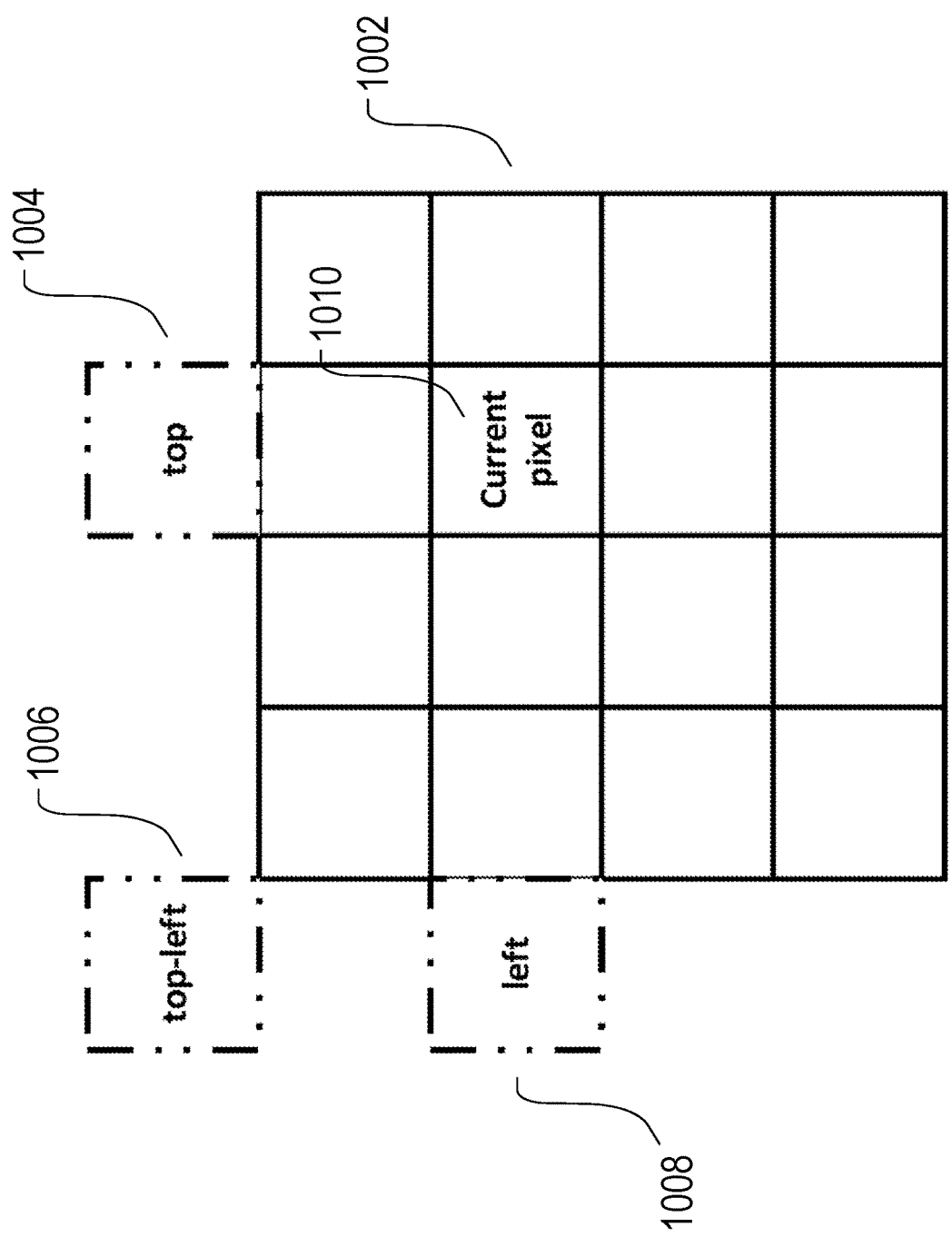
FIG. 10 shows non-directional intra prediction modes according to example embodiments of the disclosure.

In some implementations, alternative or in addition to the direction intra modes above, a predefined number of non-directional intra prediction modes may also be predefined and made available. For example, 5 non-direction intra modes referred to as smooth intra prediction modes may be specified. These non-directional intra mode prediction modes may be specifically referred to as DC, PAETH, SMOOTH, SMOOTH_V, and SMOOTH_H intra modes. Prediction of samples of a particular block under these example non-directional modes are illustrated in FIG. 10. As an example, FIG. 10 shows a 4×4 block 1002 being predicted by samples from a top neighboring line and/or left neighboring line. A particular sample 1010 in block 1002 may correspond to directly top sample 1004 of the sample 1010 in the top neighboring line of block 1002, a top-left sample 1006 of the sample 1010 as the intersection of the top and left neighboring lines, and a directly left sample 1008 of the sample 1010 in the left neighboring line of block 1002. For the example DC intra prediction mode, an average of the left and above neighboring samples 1008 and 1004 may be used as the predictor of the sample 1010. For the example PAETH intra prediction mode, the top, left, and top-left reference samples 1004, 1008, and 1006 may be fetched, and then whichever value among these three reference samples that is the closest to (top+left—topleft) may be set as the predictor for the sample 1010. For the example SMOOTH_V intra prediction mode, the sample 1010 may be predicted by a quadratic interpolation in vertical direction of the top-left neighboring sample 1006 and the left neighboring sample 1008. For the example SMOOTH_H intra prediction mode, the sample 1010 may be predicted by a quadratic interpolation in horizontal direction of the top-left neighboring sample 1006 and the top neighboring sample 1004. For the example SMOOTH intra prediction mode, the sample 1010 may be predicted by an average of the quadratic interpolations in the vertical and the horizontal directions. The non-directional intra mode implementations above are merely illustrated as a non-limiting example. Other neighboring lines, and other non-directional selection of samples, and manners of combining predicting samples for predicting a particular sample in a prediction block are also contemplated.

Selection of a particular intra prediction mode by the encoder from the directional or non-directional modes above at various coding levels (picture, slice, block, unit, etc.) may be signaled in the bitstream. In some example implementations, the exemplary 8 nominal directional modes together with 5 non-angular smooth modes (a total of 13 options) may be signaled first. Then if the signaled mode is one of the 8 nominal angular intra modes, an index is further signaled to indicate the selected angle delta to the corresponding signaled nominal angle. In some other example implementations, all intra prediction modes may be indexed all together (e.g., 56 directional modes plus 5 non-directional modes to yield 61 intra prediction modes) for signaling.

In some example implementations, the example 56 or other number of directional intra prediction modes may be implemented with a unified directional predictor that projects each sample of a block to a reference sub-sample location and interpolates the reference sample by a 2-tap bilinear filter.

Figure 11:
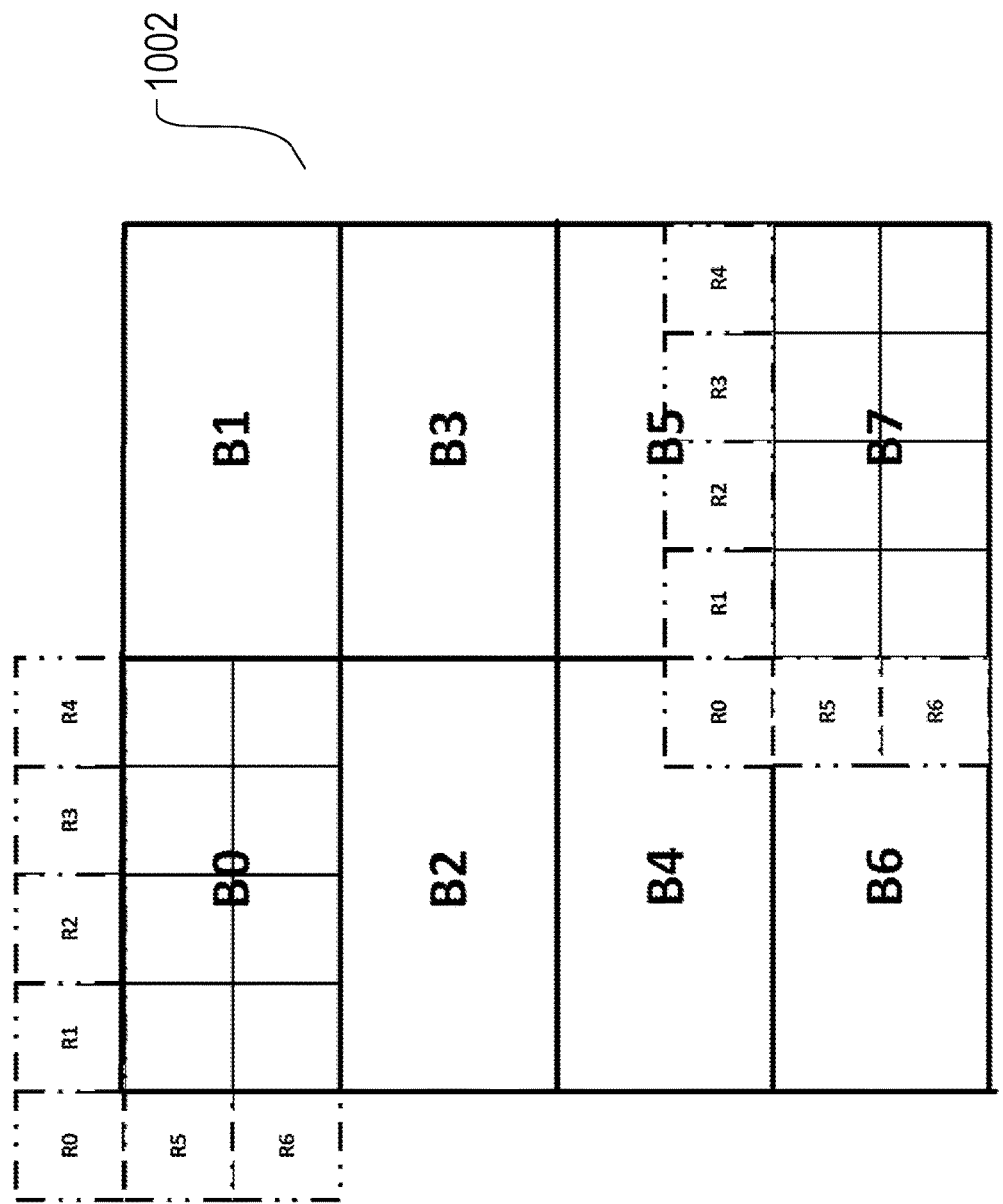
FIG. 11 shows recursive intra prediction modes according to example embodiments of the disclosure.

In some implementations, to capture decaying spatial correlation with references on the edges, additional filter modes referred to as FILTER INTRA modes may be designed. For these modes, predicted samples within the block in addition to out-of-block samples may be used as intra prediction reference samples for some patches within the block. These modes, for example, may be predefined and made available to intra prediction for at least luma blocks (or only luma blocks). A predefined number (e.g., five) of filter intra modes may be pre-designed, each represented by a set of n-tap filters (e.g., 7-tap filters) reflecting correlation between samples in, for example, a 4×2 patch and n neighbors adjacent to it. In other words, the weighting factors for an n-tap filter may be position dependent. Taking an 8×8 block, 4×2 patch, and 7-tap filtering as an example, as shown in FIG. 11, the 8×8 block 1102 may be split into eight 4×2 patches. These patches are indicated by B0, B1, B1, B3, B4, B5, B6, and B7 in FIG. 11. For each patch, its 7 neighbors, indicated by R0~R7 in FIG. 11, may be used to predict the samples in a current patch. For patch B0, all the neighbors may have been already reconstructed. But for other patches, some of the neighbors are in the current block and thus may not have been reconstructed, then the predicted values of immediate neighbors are used as the reference. For example, all the neighbors of patch B7 as indicated in FIG. 11 are not reconstructed, so the prediction samples of neighbors are used instead.

In some implementation of intra prediction, one color component may be predicted using one or more other color components. A color component may be any one of components in YCrCb, RGB, XYZ color space and the like. For example, a prediction of chroma component (e.g., chroma block) from luma component (e.g., luma reference samples), referred to as Chroma from Luma, or CfL), may be implemented. In some example implementations, cross-color prediction many only be allowed from luma to chroma. For example, a chroma sample in a chroma block may be modeled as a linear function of coincident reconstructed luma samples. The CfL prediction may be implemented as follows:

$$CfL(\alpha) = \alpha \times L^{AC} + DC \qquad (1)$$

where $L^{AC}$ denotes an AC contribution of luma component, $\alpha$ denotes a parameter of the linear model, and DC denotes a DC contribution of the chroma component. The AC components, for example is obtained for each samples of the block whereas the DC component is obtained for the entire block. To be specific, the reconstructed luma samples may be subsampled into the chroma resolution, and then the average luma value (DC of luma) may be subtracted from each luma value to form the AC contribution in luma. The AC contribution of Luma is then used in the linear mode of Eq. (1) to predict the AC values of the chroma component. To approximate or predict chroma AC component from the luma AC contribution, instead of requiring the decoder to calculate the scaling parameters, an example CfL implementation may determine the parameter $\alpha$ based on the original chroma samples and signal them in the bitstream. This reduces decoder complexity and yields more precise predictions. As for the DC contribution of the chroma component, it may be computed using intra DC mode within the chroma component in some example implementations.

Transform of a residual of either an intra prediction block or an inter prediction block may then be implemented followed by quantization of the transform coefficient. For the purpose of performing transform, both intra and inter coded blocks may be further partitioned into multiple transform blocks (sometimes interchangeably used as "transform units", even though the term "unit" is normally used to represent a congregation of the three-color channels, e.g., a "coding unit" would include luma coding block, and chroma coding blocks) prior to the transform. In some implementations, the maximum partitioning depth of the coded blocks (or prediction blocks) may be specified (the term "coded blocks" may be used interchangeably with "coding blocks"). For example, such partitioning may not go beyond 2 levels. The division of prediction block into transform blocks may be handled differently between intra prediction blocks and inter prediction blocks. In some implementations, however, such division may be similar between intra prediction blocks and inter prediction blocks.

In some example implementations, and for intra coded blocks, the transform partition may be done in a way that all the transform blocks have the same size, and the transform blocks are coded in a raster scan order. An example of such transform block partitioning of an intra coded block is shown in FIG. 12. Specifically, FIG. 12 illustrates the coded block 1202 is partitioned via an intermediate level quadtree splitting 1204 into 16 transform blocks of the same block size, as shown by 1206. The example raster scan order for coding is illustrated by the ordered arrows in FIG. 12.

Figure 13:
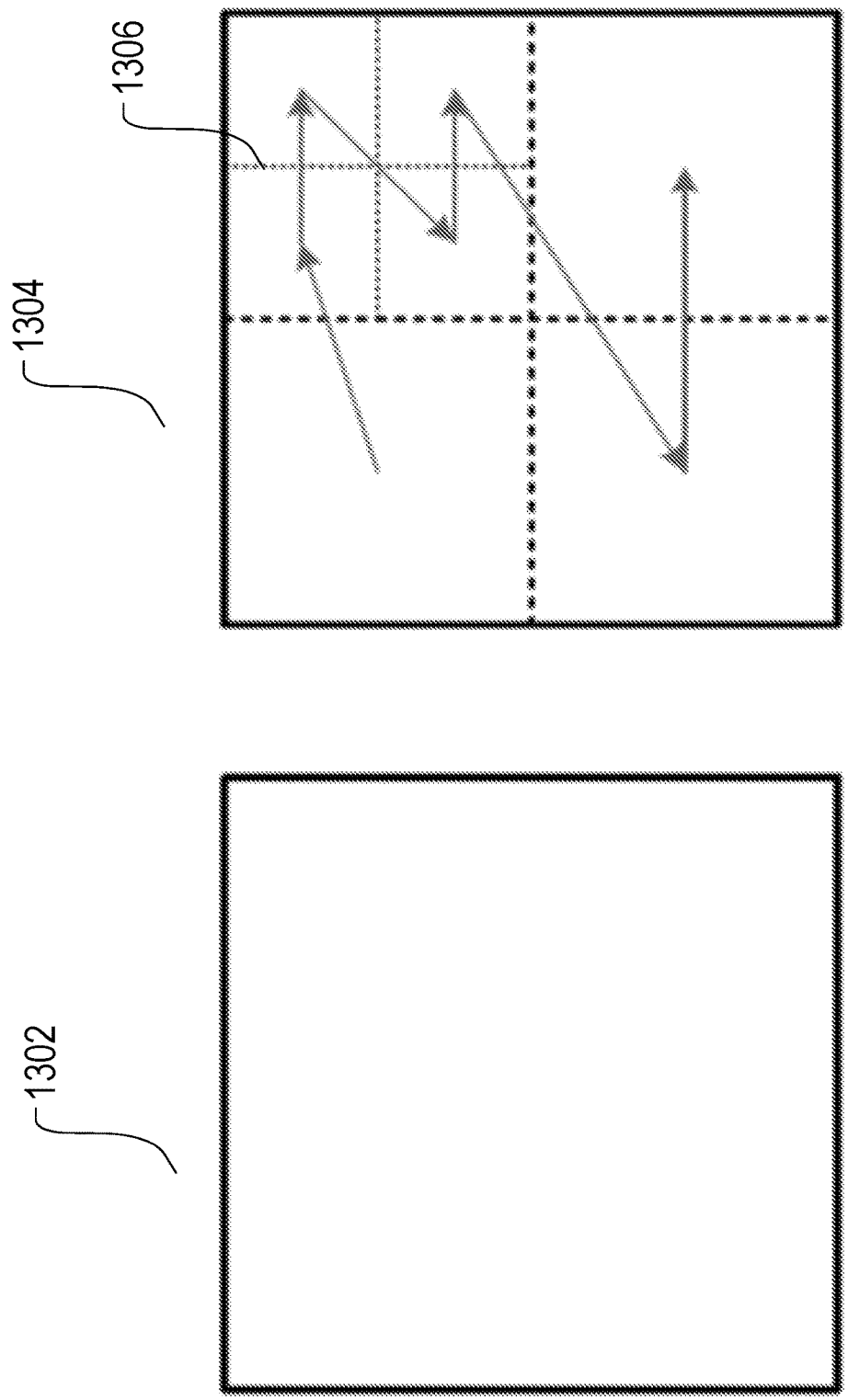
FIG. 13 shows transform block partitioning and scan of an inter prediction block according to example embodiments of the disclosure.

In some example implementations, and for inter coded blocks, the transform unit partitioning may be done in a recursive manner with the partitioning depth up to a predefined number of levels (e.g., 2 levels). Split may stop or continue recursively for any sub partition and at any level, as shown in FIG. 13. In particular, FIG. 13 shows an example where the block 1302 is split into four quadtree sub blocks 1304 and one of the subblocks is further split into four second level transform blocks whereas division of the other subblocks stops after the first level, yielding a total of 7 transform blocks of two different sizes. The example raster scan order for coding is further illustrated by the ordered arrows in FIG. 13. While FIG. 13 shows an example implementation of quadtree split of up-to two levels of square transform blocks, in some generation implementations, the transform partitioning may support 1:1 (square), 1:2/2:1, and 1:4/4:1 transform block shapes and sizes ranging from 4×4 to 64×64. In some example implementations, if the coding block is smaller than or equal to 64×64, the transform block partitioning may only be applied to luma component (in other words, the chroma transform block would be the same as the coding block under that condition). Otherwise, if the coding block width or height is greater than 64, both the luma and chroma coding blocks may be implicitly split into multiples of min (W, 64)×min (H, 64) and min (W, 32)×min (H, 32) transform blocks, respectively.

Each of the transform blocks above may then be subject to a primary transform. The primary transform essentially moves the residual in a transform block from spatial domain to frequency domain. In some implementation of the actual primary transform, in order to support the example extended coding block partitions above, multiple transform sizes (ranging from 4-point to 64-point for each dimension of the two dimensions) and transform shapes (square; rectangular with width/height ratio's 2:1/1:2, and 4:1/1:4) may be allowed.

Turning to the actual primary transform, in some example implementations, a 2-D transform process may involve a use of hybrid transform kernels (which, for example, may be composed of different 1-D transforms for each dimension of the coded residual transform block). Example 1-D transform kernels may include but are not limited to: a) 4-point, 8-point, 16-point, 32-point, 64-point DCT-2; b) 4-point, 8-point, 16-point asymmetric DST's (DST-4, DST-7) and their flipped versions; c) 4-point, 8-point, 16-point, 32-point identity transforms. Selection of transform kernels to be used for each dimension may be based on a rate-distortion (RD) criterion. For example, the basis functions for the DCT-2 and asymmetric DST's that may be implemented are listed in Table 1.

TABLE 1

Example primary transform basis functions (DCT-2, DST-4 and DST-7 for N-point input).

| Transform Type | Basis function $T_i(j)$, i, j = 0, 1, ..., N − 1 |
|---|---|
| DCT-2 | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DST-4 | $T_i(j) = \sqrt{\frac{2}{N}} \cdot \sin\left(\frac{\pi \cdot (2i+1) \cdot (2j+1)}{4N}\right)$ |
| DST-7 | $T_i(j) = \sqrt{\frac{4}{2N+1}} \cdot \sin\left(\frac{\pi \cdot (2i+1) \cdot (j+1)}{2N+1}\right)$ |

In some example implementations, the availability of hybrid transform kernels for a particular primary transform implementation may be based on the transform block size and prediction mode. An example dependency is listed in Table 2. For a chroma component, the transform type selection may be performed in an implicit way. For example, for intra prediction residuals, the transform type may be selected according to the intra prediction mode, as specified in Table 3. For inter prediction residuals, the transform type for chroma blocks may be selected according to the transform type selection of the co-located luma blocks. Therefore, for chroma component, there is no transform type signaling in the bitstream.

TABLE 2

AV1 hybrid transform kernels and their availability based on prediction modes and block sizes. Here → and ↓ denote the horizontal and vertical dimensions; ✓ and x denotes the availability of a kernel for that block size & prediction mode.

| | | Prediction mode | |
|---|---|---|---|
| Transform Types | Description | Intra | Inter |
| DCT_DCT | DCT ↓ and → | ✓ (all block sizes) | ✓ (all block sizes) |
| ADST_DCT | ADST ↓; DCT → | ✓ | ✓ |
| DCT ADST | DCT ↓; ADST → | (block | (block |

TABLE 2-continued

AV1 hybrid transform kernels and their availability based on prediction modes
and block sizes. Here → and ↓ denote the horizontal and vertical dimensions; ✓ and x
denotes the availability of a kernel for that block size & prediction mode.

| Transform Types | Description | Prediction mode | |
| --- | --- | --- | --- |
| | | Intra | Inter |
| ADST_ADST | ADST ↓ and → | size ≤ 16 × 16) | size < 16 × 16) |
| FLIPADST_DCT | FLIPADST ↓; DCT → | x | ✓ (block size ≤ 16 × 16) |
| DCT_FLIPADST | DCT ↓; FLIPADST → | | |
| FLIPADST_FLIPADST | FLIPADST ↓ and → | | |
| ADST_FLIPADST | ADST ↓; FLIPADST → | | |
| FLIPADST_ADST | FLIPADST ↓; ADST → | | |
| IDTX | IDTX ↓ and → | ✓ (block size ≤ 16 × 16) | ✓ (block size < 32 × 32) |
| V_DCT | DCT ↓; IDTX → | ✓ (block size < 16 × 16) | ✓ (block size ≤ 16 × 16) |
| H_DCT | IDTX ↓; DCT → | | |
| V_ADST | ADST ↓; IDTX → | x | ✓ (block size < 16 × 16) |
| H_ADST | IDTX ↓; ADST → | | |
| V_FLIPADST | FLIPADST ↓; IDTX → | x | ✓ (block size < 16 × 16) |
| H_FLIPADST | IDTX ↓; FLIPADST → | | |

TABLE 3

Transform type selection for chroma component intra prediction residuals.

| Intra prediction | Vertical Transform | Horizontal Transform |
| --- | --- | --- |
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

Figure 14:
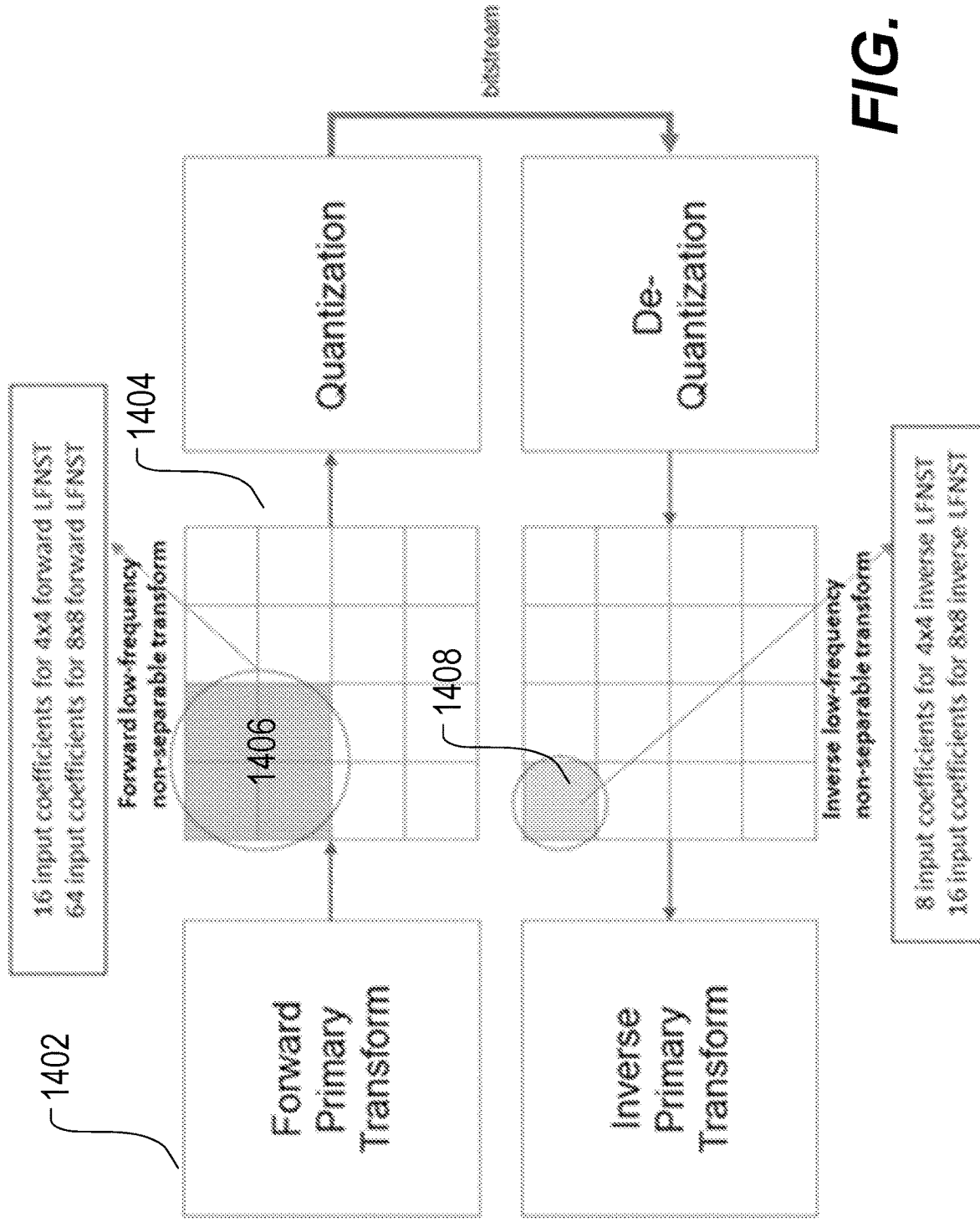
FIG. 14 shows low frequency non-separable transform process according to example embodiments of the disclosure.

In some implementation, secondary transform on the primary transform coefficients may be performed. For example, LFNST (low-frequency non-separable transform), which is known as reduced secondary transform may be applied between forward primary transform and quantization (at encoder) and between de-quantization and inverse primary transform (at decoder side), as shown in FIG. 14, to further decorrelate the primary transform coefficients. In essence, LFNST may take a portion of the primary transform coefficient, e.g., the low frequency portion (hence "reduced" from the full set of primary transform coefficients of the transform block) to proceed to secondary transform. In an example LFNST, 4×4 non-separable transform or 8×8 non-separable transform may be applied according to transform block size. For example, 4×4 LFNST may be applied for small transform blocks (e.g., min (width, height)<8) whereas 8×8 LFNST may be applied for larger transform blocks (e.g., min (width, height)>8). For example, if an 8×8 transform block is subject to 4×4 LFNST, then only the low frequency 4×4 portion of the 8×8 primary transform coefficients is further undergo secondary transform.

As specifically shown in FIG. 14, a transform block may be 8×8 (or 16×16). Thus, the forward primary transform 1402 of the transform block yields a 8×8 (or 16×16) primary transform coefficient matrix 1404, where each square unit represent a 2×2 (or 4×4) portion. The input to the forward LFNST, for example, may not be the entire 8×8 (or 16×16) primary transform coefficients. For example, a 4×4 (or 8×8) LFNST may be used for secondary transform. As such, only the 4×4 (or 8×8) low frequency primary transform coeffects of the primary transform coefficient matrix 1404, as indicated in the shaded portion (upper left) 1406 may be used as input to the LFNST. The remaining portions of the primary transform coefficient matrix may not be subject to secondary transform. As such, after the secondary transform, the portion of the primary transform coeffects subject to the LFNST becomes the secondary transform coefficients whereas the remaining portions not subject to LFNST (e.g., the unshaded portions of the matrix 1404) maintain the corresponding primary transform coefficients. In some example implementations, the remaining portion not subject of secondary transform may be all set to zero coefficient.

An example for application of a non-separable transform used in LFNST, is described below. To apply an example 4×4 LFNST, the 4×4 input block X (representing, e.g., the 4×4 low-frequency portion of a primary transform coefficient block such as the shaded portion 1406 of the primary transform matrix 1404 of FIG. 14) may be denoted as:

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (2)$$

This 2-D input matrix may be first linearized or scanned to a vector $\vec{X}$ in an example order:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T \quad (3)$$

The non-separable transform for the 4×4 LFNST may then be calculated as $\vec{F} = T\vec{X}$, where $\vec{F}$ indicates the output transform coefficient vector, and T is a 16×16 transform matrix. The resulting 16×1 coefficient vector $\vec{F}$ is subsequently reverse scanned as 4×4 block using the scanning order for that block (e.g., horizontal, vertical or diagonal). The coefficients with smaller index may be placed with the smaller scanning index in the 4×4 coefficient block. In such a manner, redundancy in a primary transform coefficients X may be further exploit via the second transform T, thereby providing additional compression enhancement.

The example LFNST above is based on a direct matrix multiplication approach to apply non-separable transform so that it is implemented in a single pass without multiple iterations. In some further example implementations, the dimension of the non-separable transform matrix (T) for the example 4×4 LFNST may be further reduced to minimize computational complexity and memory space requirement for storing the transform coefficients. Such implementations may be referred to as reduced non-separate transform (RST). In more detail, the main idea of the RST is to map an N (N is 4×4=16 in the example above, but may be equal to 64 for 8×8 blocks) dimensional vector to an R dimensional vector in a different space, where N/R (R<N) represents the dimension reduction factor. Hence, instead of N×N transform matrix, RST matrix becomes an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \quad (4)$$

where the R rows of the transform matrix are reduced R basis of the N dimensional space. The transformation thus converts an input vector or N dimension to an output vector of reduced R dimension. As such, and as shown in FIG. 14, the secondary transform coefficients 1408 transformed from the primary coefficients 1406 is reduced by a factor or N/R in dimension. The three squares around 1408 in FIG. 14 may be zero-padded.

The inverse transform matrix for RTS may be the transpose of its forward transform. For an example 8×8 LFNST (contrasted with the 4×4 LFNST above, for a more diverse description here), an example reduction factor of 4 may be applied, and thus a 64×64 direct non-separable transform matrix is accordingly reduced to 16×64 direct matrix. Further, in some implementations, a portion rather than an entirety of the input primary coefficients may be linearized into the input vector for the LFNST. For example, only a portion of the example 8×8 input primary transform coefficients may be linearized into the X vector above. For a particular example, out of the four 4×4 quadrants of the 8×8 primary transform coefficient matrix, the bottom right (high frequency coefficients) may be left out, and only the other three quadrants are linearized into a 48×1 vector using a predefined scan order rather than a 64×1 vector. In such implementations, the non-separable transform matrix may be further reduced from 16×64 to 16×48.

Hence, an example reduced 48×16 inverse RST matrix may be used at the decoder side to generate the top-left, top-right, and bottom-left 4×4 quadrants of the 8×8 core (primary) transform coefficients. Specifically, when the further reduced 16×48 RST matrices are applied instead of the 16×64 RST with the same transform set configuration, the non-separable secondary transformation would take as input the vectorized 48 matrix elements from three 4×4 quadrant blocks of the 8×8 primary coefficient block excluding right-bottom 4×4 block. In such implementations the omitted right-bottom 4×4 primary transform coefficient would be ignored in the secondary transformation. This further reduced transformation, would convert a vector of 48×1 into an output vector of 16×1, which is reverse scanned into a 4×4 matrix to fill 1408 of FIG. 14. The three squares of the secondary transform coefficients surrounding 1408 may be zero padded.

With the help of the such reduction of dimensions in the RST, memory usage for storing all LFNST matrices is reduced. In the above example, the memory usage, for example, may be reduced from 10 KB to 8 KB with reasonably insignificant performance drop compared to the implementation without dimension reduction.

In some implementations, in order to reduce complexity, LFNST may be further restricted to be applicable only if all coefficients outside the primary transform coefficient portion to be subject to LFNST (e.g., outside of the 1406 portion of 1404 in FIG. 14) are non-significant. Hence, all primary-only transform coefficients (e.g., the unshaded portion of the primary coefficient matrix 1404 of FIG. 4) may be near zero when LFNST is applied. Such a restriction allows for a conditioning of the LFNST index signalling on the last-significant position, and hence avoids some extra coefficient scanning, which may be needed for checking for significant coefficients at specific positions when this restriction is not applied. In some implementations, the worst-case handling of LFNST (in terms of multiplications per pixel) may restrict the non-separable transforms for 4×4 and 8×8 blocks to 8×16 and 8×48 transforms, respectively. In those cases, the last-significant scan position has to be less than 8, when LFNST is applied, for other sizes less than 16. For blocks with a shape of 4×N and N×4 and N>8, the restriction above implies that the LFNST is now applied only once to the top-left 4×4 region only. As all primary-only coefficients are zero when LFNST is applied, the number of operations needed for the primary transforms is reduced in such cases. From an encoder perspective, the quantization of coefficients can be simplified when LFNST transforms are tested. A rate-distortion optimized quantization (RDO) has to be done at maximum for the first 16 coefficients (in scan order), the remaining coefficients may be enforced to be zero.

In some example implementations, the RST kernels available may be specified as a number of transform sets with each transform sets including a number of non-separable transform matrices. For example, there may be a total of 4 transform sets and 2 non-separable transform matrices (kernels) per transform set for used in LFNST. These kernels may be pre-trained offline and they are thus data driven. The offline trained transform kernels may be stored in memory or hard coded in an encoding or decoding device for use during encoding/decoding process. A selection of the transform set during encoding or decoding process may be determined by the intra prediction mode. A mapping from the intra prediction modes to the transform sets may be pre-defined. An example of such predefined mapping is shown in Table 4. For example, as shown in Table 4, if one of three Cross-Component Linear Model (CCLM) modes (INTRA_LT_C-CLM, INTRA_T_CCLM or INTRA_L_CCLM) is used for the current block (i.e., 81<=predModeIntra<=83), transform set 0 may be selected for the current chroma block. For each transform set, the selected non-separable secondary transform candidate may be further specified by the explicitly signalled LFNST index. For example, the index may be signalled in a bit-stream once per intra CU after transform coefficients.

TABLE 4

Transform selection table

| IntraPredMode | Tr. set index |
| --- | --- |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

Because LFNST is restricted to be applicable only if all coefficients outside the first coefficient sub-group or portion are non-significant in the example implementations above, LFNST index coding depends on the position of the last significant coefficient. In addition, the LFNST index may be context coded but does not depend on intra prediction mode, and only the first bin may be context coded. Furthermore, LFNST may be applied for intra CU in both intra and inter slices, and for both luma and chroma. If a dual tree is enabled, LFNST indices for Luma and Chroma may be signaled separately. For inter slice (the dual tree is disabled), a single LFNST index may be signaled and used for both Luma and Chroma.

In some example implementations, when Intra Sub-Partitioning (ISP) mode is selected, LFNST may be disabled and RST index may not be signaled, because performance improvement is likely to be marginal even if RST is applied to every feasible partition block. Furthermore, disabling RST for ISP-predicted residual could reduce encoding complexity. In some further implementations, LFNST may also be disabled and the RST index may not be signaled when Multiple linear regression Intra Prediction (MIP) mode is selected.

Considering that a large CU greater than 64×64 (or any other predefined sizes representing the maximum transform block size) is implicitly split (e.g., TU tiling) due to the existing maximum transform size restriction (e.g., 64×64), an LFNST index search could increase data buffering by four times for a certain number of decode pipeline stages. Therefore, in some implementations, the maximum size that LFNST is allowed may be restricted to, for example, 64×64. In some implementations, LFNST may be enabled with DCT2 as primary transform only.

In some other implementations, intra secondary transform (IST) is provided for luma component by defining, e.g., 12 sets of secondary transforms, with, e.g., 3 kernels in each set. An intra mode dependent index may be used for transform set selection. The kernel selection within a set may be based on a signaled syntax element. The IST may be enabled when either DCT2 or ADST is used as both horizontal and vertical primary transform. In some implementations, according to the block size, a 4×4 non-separable transform or 8×8 non-separable transform can be selected. If min(tx_width, tx_height)<8 the 4×4 IST can be selected. For larger blocks 8×8 IST can be used. Here tx_width & tx_height correspond to transform block width & height, respectively. The input to IST may be low frequency primary transform coefficients in a zig-zag scan order.

Utilization of data-driven or offline-trained transform kernels for either primary or secondary transform, especially non-separable transform kernels, may facilitate enhancement of coding performance comparing to only using fixed transform such as DCT/DST. However, applying such data-driven transform kernels may increase complexity of a video codec. For example, data-driven transform kernels may require significant amount of memory for storing all possible kernels, especially for non-separable transforms. Specifically, for one of the example implementations above, there may be 12 possible sets of kernels. Each set may include, e.g., 3 kernels for different LFNST (e.g., 4×4 and 8×8). Further, LFNST kernels may be different for different primary transform types (e.g., DCT or ADST primary type for which LFNST may be allowed). In other words, if memory is used for storing off-line trained LFNST kernels, a significant amount of memory would be required. The various implementations described below for using data-driven transform may be designed to reduce the memory footprint of the stored kernels and complexity of the codec, as described in further detail below.

These various implementations or embodiments are merely examples. They may be used separately or may be combined in any order or manner. Further, each of the implementations may be embodied as methods, and encoder devices or decoder including processing circuitry (e.g., one or more processors or one or more integrated circuits) to implement the methods. In one example, the processing circuitry may include one or more processors that executing a program that is stored in a non-transitory computer-readable medium. In another example, the processing circuitry may be hard coded to implement the methods. In yet another example, the processing circuitry may be a mixture of processer component for executing computer-readable instructions and hardcoded circuitry.

In the example implementations below, the term "block" may be interpreted as a prediction block or a coding block or the like. The term block here may also be used to refer to the transform block, which as described above, may be a portion of a coding block. The term "size" of a block is used to refer to any of a width, a height, a block aspect ratio, a block area size, or the minimum/maximum between width and height of a block.

In the various example implementations below, one or more indices for identifying one or more separable or non-separable transforms (or transform kernels) among the set of separable or non-separable secondary transforms used for decoding a current transform block may be signaled in a video bitstream. Each of such indices may be denoted as stIdx. These implementations may be applied to either primary transform, secondary transform, or additional transforms applied after secondary transform. Further, the underlying principle can be applied to either separable transform or non-separable transform.

In the example implementations below, the "term basis vector" is used to refer to a spatial frequency component of a transform kernel for image transform from spatial domain to frequency domain. The terms "high-frequency basis vector" and the like are used to refer to basis vectors that may be used to generate a transform coefficient that is scanned from low to high frequency components after N coefficients, it may also refer to a basis vector that is located after N rows (or columns) of a non-separable transform kernel (and thus higher than a frequency corresponding to N). Example values of N include, but not limited to any integer values between 1 and 128 (inclusive). Delineation of high and low frequency (the number N) may be determined via RDO.

In some general example implementations, when multiple transform kernels can be applied and are provided as selectable options during encoding and decoding process, part of the basis vectors of those multiple transform kernels may be shared. For example, high frequency basis vectors between some or all of the multiple transform kernels may be shared whereas low frequency basis vectors may be individualized between the multiple transform kernels. In such a matter, such offline trained and data driven transform kernels may require less memory altogether. In particular, the shared basis vectors need not be duplicated and one copy may need to be kept in the memory between the sharing transform kernels. The manner in which the shared and individualized basis vectors are stored in the memory may be predefined.

Figure 15:
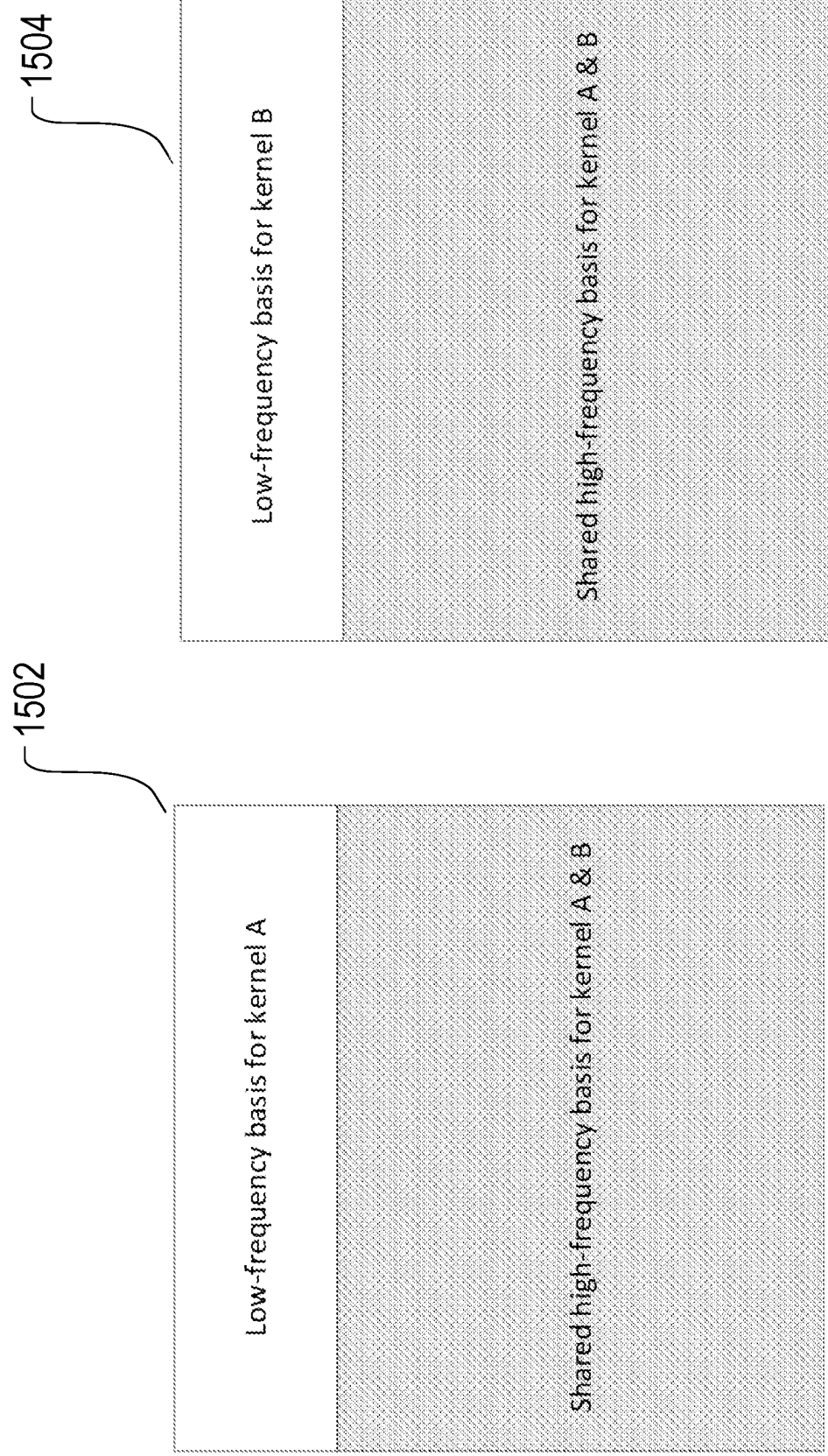
FIG. 15 shows sharing of high frequency basis vector between different transform kernels according to example embodiments of the disclosure.

Such implementations are illustrated in the FIG. 15, showing an example of how the basis vectors are shared between two LFNST transform matrices or kernels that are used for forward secondary transform. The two blocks 1502 and 1504 indicate two transform matrices, i.e., transform matrix A (left) and B (right), each row of the transform matrix represents one basis vector, the bottom rows (shaded) refer to basis vectors that are shared between A and B. The bottom basis vector may be of higher frequency. The higher frequency basis vectors may be shared in the memory between these example kernels. For inverse transform, the shared basis vectors of multiple transform matrices can be the right N columns of the transform matrix as a result of transpose for reverse transform.

The example transform kernels of FIG. 15 are illustrated for secondary transform kernels that are applied to linearized vectors of primary transform coefficients. As such, the frequency axis of such transform kernel as shown in FIG. 15 is one dimensional (from top to bottom). This would be the case for all 1-D kernels. For a transform kernel that are 2-D (e.g., when data driven 2-D kernels are used for primary transform) then lower frequency components would be at the upper left portion of the 2-D transform kernel whereas higher frequency components would be at the lower right portion of the 2-D transform kernel. In that case, the lower-right portions may be shared among different 2-D kernels.

In some example implementations, for a set of multiple transform kernels that are applied for a specific intra prediction mode, the high-frequency basis vectors may be constructed the same (shared), while the low-frequency basis vectors may be different (individualized). In other words, a set of kernels corresponding to a particular intra prediction mode (e.g., the various direction, non-directional, and other intra prediction modes described above) may have similar dimensionality and thus may share, e.g., high frequency basis vectors with individualized low frequency basis vectors. A predefined threshold may be used for delineation of low and high frequencies. In some implementations, the delineation of high and low frequencies may be data driven and thus pretrained. As such, the frequency delineation threshold may be different for different intra prediction modes.

In some example implementations, when multiple secondary transform kernels are applied together with different primary transforms, part or all of the multiple secondary transform kernels can be shared between the different primary transform types. In other words, different types of primary transform may correspond to different kernels for secondary transformation. These different secondary transform kernels may contain individualized low frequency basis vectors and are nevertheless be constructed with shared high frequency basis vectors. That is, secondary transform kernel selection, if applicable for multiple primary transform types, may be independent of the primary transform type (e.g., independent of DCT or ADST primary transform types).

In some example implementations, when multiple secondary transform kernels are applied together with different primary transforms, high-frequency basis vectors in the multiple secondary transform kernels may be shared between the different primary transform types, while the low-frequency basis vectors can be different or individualized. A predefined threshold may be used for delineation of low and high frequencies. Again, the delineation of high and low frequencies (or the number N) may be data driven and thus pretrained. As such, the frequency delineation threshold may be different for different intra prediction modes.

In some example implementations, for multiple secondary transform kernels that are applied together with a specific type of primary transform, the high-frequency basis vectors may be the same, while the low-frequency basis vectors may be different. In some further implementations, both the high-frequency basis vectors and low frequency base vectors of kernels corresponding to different primary transform types may be independent.

In some example implementations, the number N of high frequency basis vectors of shared between various transform kernels may be integer power of 2, e.g., 1, 2, 4, 8, 16, 32, 64, 128. Particularly for reduced secondary transform matrix, the number of N high frequency rows may be a power-of-2 value, e.g., 1, 2, 4, 8, 16, 32, 64, 128.

In some example implementations, the value of N may depend on the transform size. For examples, a ratio between N and the total number of basis vectors of the transform kernels may be specified.

In some examples, each of and any combination of the above implementations may be applied to LFNST secondary transform. As such, the set of kernels sharing high frequency basis vectors but containing individualized low frequency basis vectors may include secondary LFNST transform kernels.

In some examples, each of and any combination of the above implementations may be applied to Intra Secondary Transform (IST).

In some examples, each of and any combination of the above implementations may be applied to Line Graph Transform. (LGT).

The various kernels above may be predetermined. They may be pretrained offline. For kernels sharing high frequency basis vectors, they may be jointly trained. The threshold frequency delineating the shared basis vectors and the individualized basis vectors may be trained offline.

During encoding or decoding process, the various kernels above may reside in a memory space for use by an encoder or decoder, only one copy of the shared basis vector need to be stored in the memory space. Pointers to the memory locations for the shared basis vector may be used to access these shared basis vector when the various kernels are used during the encoding or decoding process.

Figure 16:
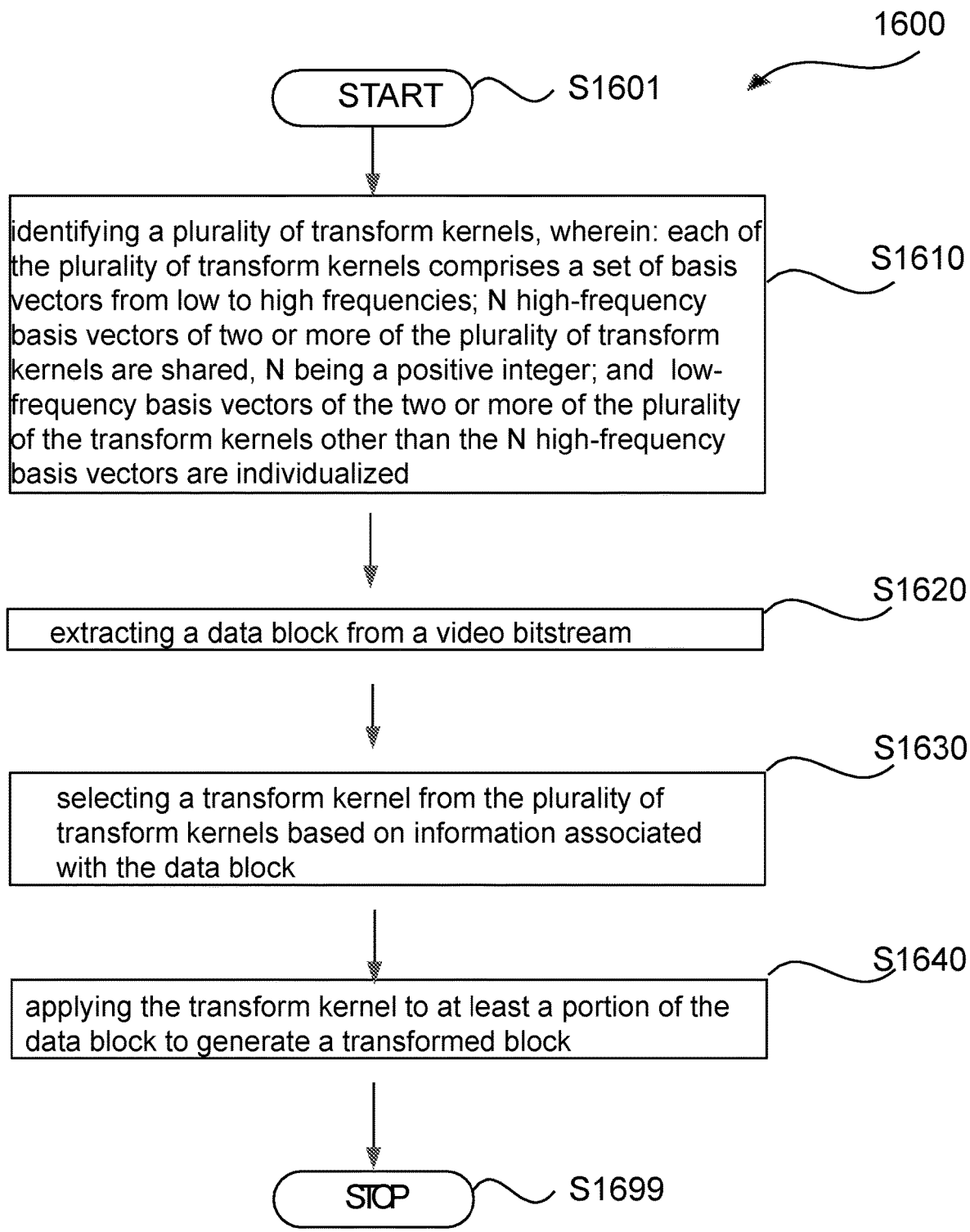
FIG. 16 shows a flow chart according to example embodiments of the disclosure.

FIG. 16 shows a flow chart 1600 of an example method following the principles underlying the implementations above. The example method flow starts at 1601. In S1610, a plurality of transform kernels are identified, wherein: each of the plurality of transform kernels comprises a set of basis vectors from low to high frequencies; N high-frequency basis vectors of two or more of the plurality of transform kernels are shared, N being a positive integer; and low-frequency basis vectors of the two or more of the plurality of the transform kernels other than the N high-frequency basis vectors are individualized. In S1620, a data block from a video bitstream is extracted. In S1630, a transform kernel from the plurality of transform kernels is selected based on information associated with the data block. In S1640, the transform kernel to at least a portion of the data block is applied to generate a transformed block. The example method flow ends at S1699.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block.

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
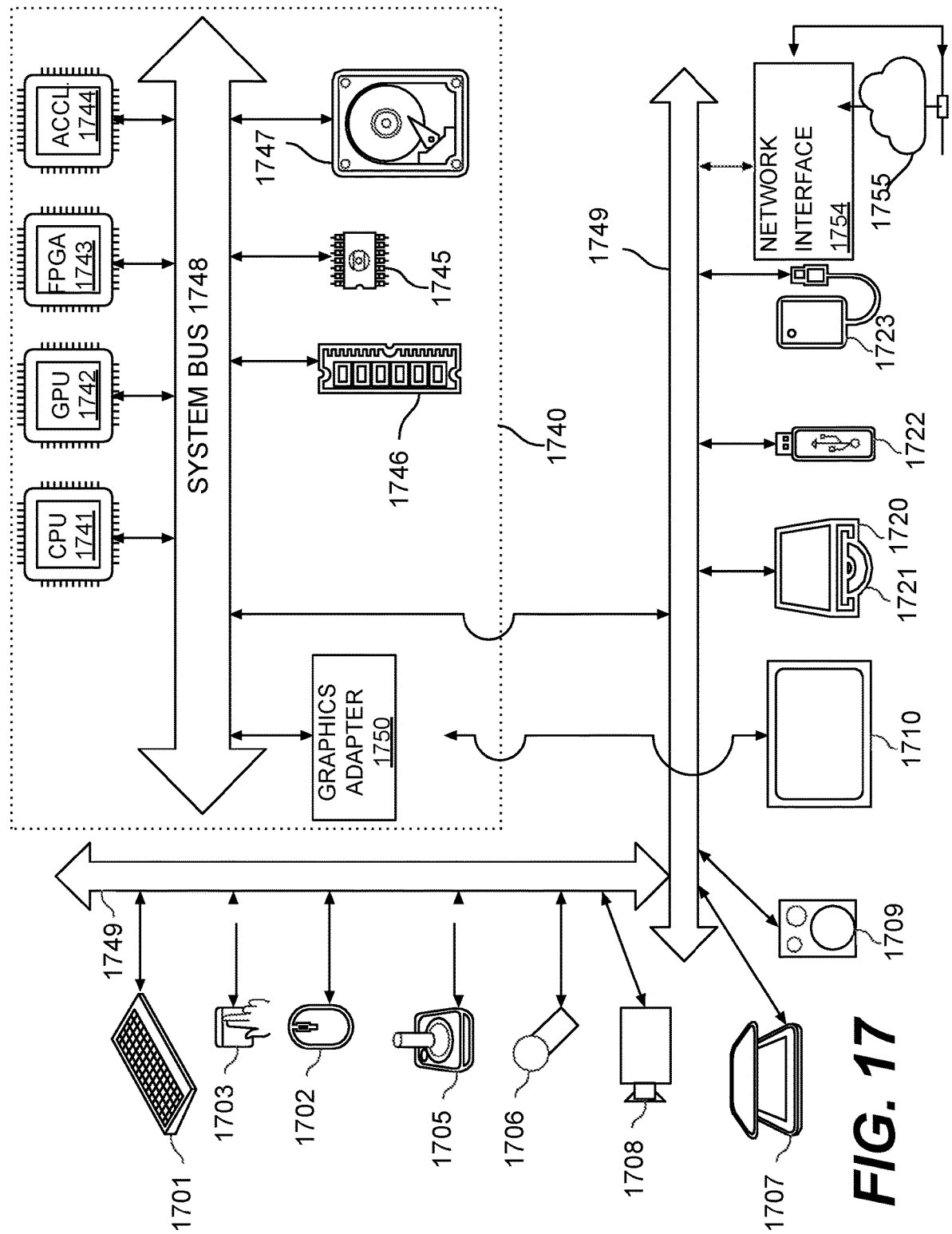
FIG. 17 shows a schematic illustration of a computer system in accordance with example embodiments of the disclosure.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface (1754) to one or more communication networks (1755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), graphics adapters (1750), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). In an example, the screen (1710) can be connected to the graphics adapter (1750). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data can also be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
HDR: high dynamic range
SDR: standard dynamic range
JVET: Joint Video Exploration Team
MPM: most probable mode
WAIP: Wide-Angle Intra Prediction
CU: Coding Unit
PU: Prediction Unit
TU: Transform Unit
CTU: Coding Tree Unit
PDPC: Position Dependent Prediction Combination
ISP: Intra Sub-Partitions
SPS: Sequence Parameter Setting
PPS: Picture Parameter Set
APS: Adaptation Parameter Set
VPS: Video Parameter Set
DPS: Decoding Parameter Set
ALF: Adaptive Loop Filter
SAO: Sample Adaptive Offset
CC-ALF: Cross-Component Adaptive Loop Filter
CDEF: Constrained Directional Enhancement Filter
CCSO: Cross-Component Sample Offset
LSO: Local Sample Offset
LR: Loop Restoration Filter
AV1: AOMedia Video 1
AV2: AOMedia Video 2

What is claimed is:

1. A method for video decoding, comprising:
receiving a video bitstream comprising a data block;
identifying a plurality of transform kernels to be applied for transform coding of the data block, wherein at least a first transform kernel and a second transform kernel share a plurality of basis vectors;
applying the plurality of transform kernels to the data block to generate a transformed block; and
reconstructing samples in the data block based on the transformed block.

2. The method of claim 1, wherein:
each of the plurality of transform kernels comprises a set of basis vectors from low to high frequencies;
N high-frequency basis vectors of two or more of the plurality of transform kernels are shared, N being a positive integer; and
low-frequency basis vectors of the two or more of the plurality of transform kernels other than the N high-frequency basis vectors are individualized.

3. The method of claim 2, wherein applying the plurality of transform kernels comprises selecting a transform kernel from the plurality of transform kernels to apply based on characteristics of the data block.

4. The method of claim 2, wherein the plurality of transform kernels are pre-trained offline.

5. The method of claim 4, wherein the plurality of transform kernels are jointly trained offline to determine the N high-frequency basis vector being shared.

6. The method of claim 2, wherein the N high-frequency basis vectors comprise basis vectors with frequencies higher than a predetermined threshold frequency.

7. The method of claim 6, wherein the plurality of transform kernels and the predetermined threshold frequency are pre-trained offline.

8. The method of claim 2, wherein:
the plurality of transform kernels comprise secondary transform kernels applicable to transforming primary transform coefficients; and
the data block comprises an array of primary transform coefficients.

9. The method of claim 2, wherein:
the two or more of the plurality of transform kernels sharing the N high-frequency basis vectors correspond to a same one of a plurality of intra-picture prediction modes; and
all transform kernels among the plurality of the transform kernels assigned to the same one of the plurality of intra-picture prediction modes share the N high-frequency basis vectors with other low-frequency basis vectors being individualized.

10. The method of claim 2, wherein the two or more of the plurality of transform kernels sharing the N high-frequency basis vectors are assigned to two or more different intra-picture prediction modes.

11. The method of claim 2, wherein:
the plurality of transform kernels are secondary transform kernels;
the data block comprises primary transform coefficients; and
the two or more of the plurality of transform kernels sharing the N high-frequency basis vectors are configured to transform primary transform coefficients generated from primary transforms having a same transform type.

12. The method of claim 2, wherein N is an integer power of 2 and smaller than a predefined upper bound.

13. The method of claim 2, wherein N depends on a transform size.

14. The method of claim 2, wherein the plurality of transform kernels are secondary low frequency non-separable transform (LFNST) kernels.

15. The method of claim 2, wherein the plurality of transform kernels are configured for intra secondary transform (IST) or for line graph transform (LGT).

16. A device for encoding a data block of a video frame, comprising a circuitry configured to:
identify a plurality of transform kernels to be applied for transform coding of the data block, wherein at least a first transform kernel and a second transform kernel share a plurality of basis vectors;
select a transform kernel from the plurality of transform kernels based on characteristics of the data block;
apply the transform kernel to the data block to generate a transformed block of the data block; and
encode the transformed block to generate a bitstream.

17. The device of claim 16, wherein:
each of the plurality of transform kernels comprises a set of basis vectors from low to high frequencies;
N high-frequency basis vectors of two or more of the plurality of transform kernels are shared, N being a positive integer; and
low-frequency basis vectors of the two or more of the plurality of the transform kernels other than the N high-frequency basis vectors are individualized.

18. The device of claim 17 wherein:
the plurality of transform kernels comprise secondary transform kernels applicable to transforming primary transform coefficients; and
the data block comprises an array of primary transform coefficients.

19. The device of claim 17, wherein:
the two or more of the plurality of transform kernels sharing the N high-frequency basis vectors correspond to a same one of a plurality of intra-picture prediction modes; and
all transform kernels among the plurality of the transform kernels assigned to the same one of the plurality of intra-picture prediction modes share the N high-frequency basis vectors with other low-frequency basis vectors being individualized.

20. A method for processing a data block of a video, comprising converting the data block to a bitstream, where the bitstream comprises:
an encoded data block generated by:
identifying a plurality of transform kernels to be applied for transform coding of the data block, wherein at least a first transform kernel and a second transform kernel share a plurality of basis vectors;
selecting a transform kernel from the plurality of transform kernels based on characteristics of the data block;
applying the transform kernel to the data block to generate a transformed block of the data block; and
encoding the transformed block to generate the bitstream.

* * * * *